(12) United States Patent
Cabrera et al.

(10) Patent No.: US 10,664,924 B1
(45) Date of Patent: May 26, 2020

(54) COMPUTER-IMPLEMENTED METHODS, SYSTEMS AND ARTICLES OF MANUFACTURE FOR PROCESSING SENSITIVE ELECTRONIC TAX RETURN DATA

(71) Applicant: Intuit Inc., Mountain View, CA (US)

(72) Inventors: Luis F. Cabrera, Bellevue, WA (US); Gang Wang, San Diego, CA (US); Kevin M. McCluskey, Carlsbad, CA (US)

(73) Assignee: INTUIT INC., Mountain View, CA (US)

( * ) Notice: Subject to any disclaimer, the term of this patent is extended or adjusted under 35 U.S.C. 154(b) by 544 days.

(21) Appl. No.: 14/701,087

(22) Filed: Apr. 30, 2015

(51) Int. Cl.
  *G06Q 40/00* (2012.01)
  *G06F 3/048* (2013.01)

(52) U.S. Cl.
  CPC .................. *G06Q 40/123* (2013.12)

(58) Field of Classification Search
  CPC .......................... G06Q 10/00; G06F 17/30126
  USPC ........................................................ 703/31
  See application file for complete search history.

(56) References Cited

U.S. PATENT DOCUMENTS

| | | |
|---|---|---|
| 4,213,251 A | 7/1980 | Foundos |
| 4,809,219 A | 2/1989 | Ashford et al. |
| 5,006,998 A | 4/1991 | Yasunobu |
| 5,495,607 A * | 2/1996 | Pisello .............. G06F 17/30126 707/781 |
| 5,557,761 A | 9/1996 | Chan et al. |
| 5,583,933 A | 12/1996 | Mark |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Notice of Allowance and Fee(s) Due dated May 5, 2017 in U.S. Appl. No. 14/206,682, (30pages).

(Continued)

*Primary Examiner* — Kirsten S Apple
*Assistant Examiner* — Christine Johnson
(74) *Attorney, Agent, or Firm* — DLA Piper LLP (US)

(57) ABSTRACT

Computer-implemented methods, computerized systems and articles of manufacture for processing sensitive electronic tax return data. A tax logic agent reads runtime data of the electronic tax return from a shared data store and identifies logic computations to be performed given a directed completion graph and runtime data. Certain logic computations involve sensitive runtime data (name, social security number, other personal identification data, and private data such as address, telephone number and account numbers), are indicated as such, and may be processed differently than other logic computations involving runtime data not indicated to be sensitive data. Logic computations involving sensitive data may be performed locally, whereas logic computations not involving sensitive data may be performed by a remote computing resource, in which case computation results are merged and used to generate a non-binding suggestion of a topic or question to present to the user via the user interface controller.

22 Claims, 33 Drawing Sheets

(56) References Cited

U.S. PATENT DOCUMENTS

| | | |
|---|---|---|
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendori et al. |
| 2010/0131394 A1 | 5/2010 | Rutsch et al. |
| 2010/0153138 A1 | 6/2010 | Evans |

(56) References Cited

U.S. PATENT DOCUMENTS

| | | | |
|---|---|---|---|
| 2011/0004537 A1 | 1/2011 | Allanson et al. | |
| 2011/0078062 A1 | 3/2011 | Kleyman | |
| 2011/0145112 A1 | 6/2011 | Abeles | |
| 2011/0173222 A1 | 7/2011 | Sayal et al. | |
| 2011/0225220 A1 | 9/2011 | Huang et al. | |
| 2011/0258195 A1 | 10/2011 | Welling | |
| 2011/0258610 A1 | 10/2011 | Aaraj et al. | |
| 2011/0264569 A1 | 10/2011 | Houseworth | |
| 2012/0016817 A1 | 1/2012 | Smith et al. | |
| 2012/0027246 A1 | 2/2012 | Tifford | |
| 2012/0030076 A1 | 2/2012 | Checco et al. | |
| 2012/0030577 A1 | 2/2012 | Akolkar et al. | |
| 2012/0072321 A1 | 3/2012 | Christian et al. | |
| 2012/0084185 A1 | 4/2012 | Ciaramitaro | |
| 2012/0109792 A1* | 5/2012 | Eftekhari | G06F 21/31 705/31 |
| 2012/0109793 A1 | 5/2012 | Abeles | |
| 2012/0136764 A1 | 5/2012 | Miller | |
| 2012/0278365 A1 | 11/2012 | Labat et al. | |
| 2013/0036347 A1 | 2/2013 | Eftekhari | |
| 2013/0080302 A1 | 3/2013 | Allanson et al. | |
| 2013/0097262 A1 | 4/2013 | Dandison | |
| 2013/0111032 A1* | 5/2013 | Alapati | G06F 9/5072 709/226 |
| 2013/0138586 A1 | 5/2013 | Jung et al. | |
| 2013/0185347 A1 | 7/2013 | Romano | |
| 2013/0187926 A1 | 7/2013 | Silverstein et al. | |
| 2013/0198047 A1 | 8/2013 | Houseworth | |
| 2013/0218735 A1 | 8/2013 | Murray | |
| 2013/0262279 A1 | 10/2013 | Finley et al. | |
| 2013/0282539 A1 | 10/2013 | Murray | |
| 2013/0290169 A1 | 10/2013 | Bathula | |
| 2013/0305356 A1 | 11/2013 | Cohen-Ganor | |
| 2014/0108213 A1 | 4/2014 | Houseworth | |
| 2014/0172656 A1 | 6/2014 | Shaw | |
| 2014/0201045 A1 | 7/2014 | Pai et al. | |
| 2014/0207633 A1 | 7/2014 | Aldrich et al. | |
| 2014/0241631 A1 | 8/2014 | Huang | |
| 2014/0244455 A1 | 8/2014 | Huang | |
| 2014/0244457 A1 | 8/2014 | Howell et al. | |
| 2014/0337189 A1 | 11/2014 | Barsade et al. | |
| 2015/0142703 A1 | 5/2015 | Rajesh | |
| 2015/0237205 A1 | 8/2015 | Waller et al. | |
| 2015/0254623 A1 | 9/2015 | Velez et al. | |
| 2015/0269491 A1 | 9/2015 | Tripathi et al. | |
| 2016/0027127 A1 | 1/2016 | Chavarria et al. | |
| 2016/0063645 A1 | 3/2016 | Houseworth et al. | |
| 2016/0071112 A1 | 3/2016 | Unser | |
| 2016/0078567 A1 | 3/2016 | Goldman et al. | |
| 2016/0092993 A1 | 3/2016 | Ciaramitaro | |
| 2016/0092994 A1 | 3/2016 | Roebuck et al. | |
| 2016/0098804 A1 | 4/2016 | Mascaro et al. | |
| 2016/0148321 A1 | 5/2016 | Ciaramitaro et al. | |
| 2016/0275627 A1 | 9/2016 | Wang | |
| 2017/0004583 A1 | 1/2017 | Wang | |
| 2017/0004584 A1 | 1/2017 | Wang | |
| 2017/0032468 A1 | 2/2017 | Wang et al. | |
| 2018/0032855 A1 | 2/2018 | Wang et al. | |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018080562 A1 | 5/2018 |
| WO | 2018080563 A1 | 5/2018 |

OTHER PUBLICATIONS

PCT International Search Report for PCT/US2016/044094, Applicant: Intuit Inc., Form PCT/ISA/210 and 220, dated Apr. 24, 2017 (5pages).

PCT Written Opinion of the International Search Authority for PCT/US2016/044094, Applicant: Intuit Inc., Form PCT/ISA/237, dated Apr. 24, 2017 (5pages).

PCT International Search Report for PCT/US2016/067839, Applicant: Intuit Inc., Form PCT/ISA/210 and 220, dated Apr. 25, 2017 (5pages).

PCT Written Opinion of the International Search Authority for PCT/US2016/067839, Applicant: Intuit Inc., Form PCT/ISA/237, dated Apr. 26, 2017 (12pages).

Amendment dated May 3, 2017 in U.S. Appl. No. 14/462,411, filed Aug. 18, 2014, (5pages).

Response dated May 15, 2017 in U.S. Appl. No. 14/448,962, filed Jul. 31, 2014, (30pages).

Office Action dated May 15, 2017 in U.S. Appl. No. 14/462,345, filed Aug. 18, 2014, (57pages).

Office Action dated May 15, 2017 in U.S. Appl. No. 14/555,902, filed Nov. 28, 2014, (8pages).

Office Action dated May 2, 2017 in U.S. Appl. No. 14/698,733, filed Apr. 28, 2015, (31pages).

Final Office Action dated Jun. 6, 2017 in U.S. Appl. No. 14/462,411, (20pges).

Amendment After Final Office Action dated Jun. 6, 2017 in U.S. Appl. No. 14/448,922, (8pages).

Interview Summary dated Jun. 7, 2017 in U.S. Appl. No. 14/448,922, (2pages).

Advisory Action dated Jun. 14, 2017 in U.S. Appl. No. 14/448,922, (4pages).

Amendment After Final Office Action dated Jun. 20, 2017 in U.S. Appl. No. 14/448,922, (14pages).

Office Action dated May 26, 2017 in U.S. Appl. No. 14/553,347, (43pages).

Office Action dated Jun. 2, 2017 in U.S. Appl. No. 14/673,261, (65pages).

Office Action dated May 25, 2017 in U.S. Appl. No. 14/529,736, (42pages).

Office Action dated Jun. 6, 2017 in U.S. Appl. No. 14/462,315, (54pages).

Amendment and Response dated Jun. 2, 2017 in U.S. Appl. No. 14/448,986, (12pages).

Interview Summary dated Jun. 2, 2017 in U.S. Appl. No. 14/448,986, (3pages).

Office Action dated Jun. 7, 2017 in U.S. Appl. No. 14/555,334, (54pages).

Office Action dated Jun. 7, 2017 in U.S. Appl. No. 14/555,296, (7pages).

Response dated Jun. 7, 2017 in U.S. Appl. No. 14/555,543, (21pages).

Amendment dated Jun. 9, 2017 in U.S. Appl. No. 14/097,057, (26pages).

Office Action dated Jun. 22, 2017 in U.S. Appl. No. 14/698,746, (50pages).

Response to Restriction Requirement dated Jul. 5, 2017 in U.S. Appl. No. 14/555,902, (12pages).

PCT International Search Report for PCT/US2016/067866 Applicant: Intuit Inc., Form PCT/ISA/210 and 220, dated Jul. 26, 2017 (5pages).

PCT Written Opinion of the International Search Authority for PCT/US2016/067866, Applicant: Intuit Inc., Form PCT/ISA/237, dated Jul. 26, 2017 (4pages).

PCT International Search Report for PCT/US2016/067867 Applicant: Intuit Inc., Form PCT/ISA/210 and 220, dated Jul. 26, 2017 (5pages).

PCT Written Opinion of the International Search Authority for PCT/US2016/067867, Applicant: Intuit Inc., Form PCT/ISA/237, dated Jul. 26, 2017 (9pages).

Response to Office Action dated Jul. 17, 2017 in U.S. Appl. No. 14/462,345, (17pages).

Advisory Action dated Jul. 31, 2017 in U.S. Appl. No. 14/462,345, (3pages).

(56) References Cited

OTHER PUBLICATIONS

Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/ , printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports-graphs-and-snapshots/track-the-earnings-taxes-deductions-or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.

(56) References Cited

OTHER PUBLICATIONS

Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 141448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).

(56) References Cited

OTHER PUBLICATIONS

Communication pursuant to Rules 70(2) and 70a(2) EPC dated Apr. 25, 2018 in European Patent Application No. 16843282.1-1217, (1page).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481 (44pgs.).
Office Action dated Jun. 22, 2017 in U.S. Appl. No. 14/698,746, (50pgs.).
Amendment and Response dated Sep. 22, 2017 in U.S. Appl. No. 14/698,746 (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Vanderbilt University, "Free tax prep help available for Vanderbilt employees", Feb. 6, 2014, Vanderbilt University, p. 1-3 [NPL-1].
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).

(56) References Cited

OTHER PUBLICATIONS

PCT International Preliminary Report on Patentability (Chapter I of the Patent Cooperation Treaty) for PCT/US2016/039919, Applicant: Intuit Inc., Form PCT/IB/326 and 373, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).

Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
U.S. Appl. No. 14/701,149, filed Apr. 30, 2015, Pending.
U.S. Appl. No. 14/701,030, filed Apr. 30, 2015, Pending.
Vanderbilt University, "Free Tax Prep Help Available for Vanderbilt Employees"; Vanderbilt University, Feb. 6, 2014, pp. 1-3.
U.S. Appl. No. 14/701,149, filed Apr. 30, 2015.
U.S. Appl. No. 14/701,030 filed Apr. 30, 2015.
U.S. Appl. No. 14/701,149, filed Apr. 30, 2015 (Oct. 13, 2019-present).
U.S. Appl. No. 14/701,030, filed Apr. 30, 2015 (Oct. 13, 2019-present).

* cited by examiner

| | $Q_A$ | $Q_B$ | $Q_C$ | $Q_D$ | $Q_E$ | $Q_F$ | $Q_G$ | Goal |
|---|---|---|---|---|---|---|---|---|
| 461a — Rule₁ | Y | ? | N | ? | ? | ? | ? | Yes |
| 461b — Rule₂ | Y | ? | Y | ? | ? | ? | Y | Yes |
| 461c — Rule₃ | N | Y | ? | ? | Y | ? | Y | Yes |
| 461d — Rule₄ | N | Y | ? | ? | N | N | ? | Yes |
| 461e — Rule₅ | N | N | ? | N | ? | N | ? | Yes |

460

464

462a 462b 462c 462d 462e 462f 462g

Transform

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | N | N | Y | Yes |
| R4 | N | Y | ? | ? | N | N | ? | Yes |
| R5 | N | N | ? | N | ? | ? | ? | Yes |

Columns (Questions 462)

(Rows) (Rules 461)

Cross Out Since Answer to Question A is "yes" 1010

FIG. 6C

| Signature / Identifier — 2005 | Result (Prior Calc of Prior Return) — 2012 |
|---|---|
| Signature 1 | Determined Result 1 |
| Signature 2 | Determined Result 2 |
| Signature 3 | Determined Result 3 |
| Signature 4 | Determined Result 4 |
| Signature 5 | Determined Result 5 |

COMPUTER-IMPLEMENTED METHODS, SYSTEMS AND ARTICLES OF MANUFACTURE FOR PROCESSING SENSITIVE ELECTRONIC TAX RETURN DATA

CROSS-REFERENCE TO RELATED APPLICATIONS

This application is related to U.S. application Ser. No. 14/701,087, filed on Apr. 30, 2015, entitled COMPUTER-IMPLEMENTED METHODS, SYSTEMS AND ARTICLES OF MANUFACTURE FOR ELECTRONIC TAX RETURN COMPUTATION ALLOCATION and U.S. application Ser. No. 14/701,149, filed on Apr. 30, 2015, entitled COMPUTER-IMPLEMENTED METHODS, SYSTEMS AND ARTICLES OF MANUFACTURE FOR DETERMINING ELECTRONIC TAX RETURN CALCULATION RESULTS, the contents of which are incorporated herein by reference.

SUMMARY

Certain embodiments are related to components of a tax preparation application determining how to allocate computations among computing resources, which may involve treating sensitive personal or private data differently than other data, and determining which calculation results, which may be determined without performing the calculations for a current tax return, can be used to begin or prepare at least a portion of electronic tax returns of various taxpayers, even taxpayers that have not started their own returns and have not even purchased a tax preparation application.

Certain embodiments involve a modular tax preparation system that includes a tax logic agent that performs logic computations, a user interface controller, a calculation engine that performs calculation computations, and a data store shared by these components. With these separate components, tax logic is separated, divorced from or independent of user interface functions such that, for example, tax logic is not programmed within an interview screen as is the case with various known tax preparation applications.

One embodiment involves determining which computing resource will be used to perform tax-related computations. Tax-related computations may be logic computations and/or calculation computations. Embodiments are able to determine certain computations that are executed locally (e.g., by a tax logic agent or a calculation engine) and others that are executed remotely, assigned to a remote computing resource for execution, or allocated among multiple remote computing resources. In the event of remote execution of computations, results generated by remote computation can be used with or combined with results of locally executed computations to generate one or more non-binding suggestions, or non-binding suggestions may be for locally executed computations while other non-binding suggestions are for remotely executed computations.

One embodiment is directed to a computer-implemented method for allocating electronic tax return computations during preparation of an electronic tax return and involves a modular tax preparation system including a tax logic agent, a user interface controller, a calculation engine, and a data store shared among these components. The method comprises the calculation engine reading first runtime data of the electronic tax return from the shared data store and determining a first set of computations to be executed given the first runtime data. The modular system also includes an arbiter module associated with the calculation engine. The arbiter module communicates with remote computing resources through respective networks and selects one or more remote computing sources considering pre-determined criteria and respective remote computing resource attributes. The method further comprises transmitting data of the first set of determined computations to be executed through a network to the selected remote computing resource, which executes the computations. Results of the remotely executed computations are received by the calculation engine and are entered into a calculation directed graph and are written to the shared data store for further processing by the tax logic agent.

A further embodiment is directed to a computer implemented method for allocating electronic tax return computations during preparation of the electronic tax return and comprises a calculation engine of a modular tax preparation system reading first runtime data of the electronic tax return from the shared data store and determining a first set of calculations to be executed given the first runtime data and a directed graph including input or leaf nodes, function nodes and result nodes. Electronic tax return data received through the user interface manager and written by the user interface manager to the shared data store is read by the calculation engine. At least a portion of the directed graph is populated with the first runtime data. An arbiter module associated with the calculation engine communicates with remote computing resources through respective networks and selects one or more remote computing sources based at least in part upon spot instances. Data of the first set of determined computations to be executed is transmitted through respective networks to one or more selected remote computing resources, which perform the computations per spot instances, results of which are received by the calculation engine. The calculation engine writes the results to the shared data store and populates corresponding result or other nodes of the directed calculation graph.

A further embodiment is directed to a computer implemented method for processing data of electronic tax return during preparation of the electronic tax return and that is performed by a modular tax preparation system including a tax logic agent, user interface controller, the tax logic agent being loosely coupled to the user interface controller such that tax logic is separate from user interface functions, calculation engine, and shared data store. The method comprises the tax logic agent reading runtime data of the electronic tax return from the shared data store and identifying logic computations (versus calculation computations of a directed calculation graph) to be performed given the runtime data and analysis of a completeness graph or decision table based thereon. A first subset of logic computations involves certain runtime data indicated to be sensitive data (e.g., as indicated or selected by the user or taxpayer or based on pre-defined sensitive data). A second subset of logic computations involves certain first runtime data not indicated to be sensitive data. The tax logic agent generates a non-binding suggestion for the user interface controller based at least in part upon respective first and second results generated by executing respective first and second subset of logic computations and providing a non-binding suggestion to the user interface controller.

Further embodiments are directed to computer-implemented methods for determining whether and how runtime data, which may be a result generated by local and/or remote execution of logic computations and/or calculation computations, applies to one or more other taxpayers. Embodiments provide for identifying taxpayers that have common attributes or tax situations as other taxpayers such that electronic tax returns of the other taxpayers can be at least partially populated with calculation results, even before the other taxpayers being preparing their own returns, and even before they have purchased a tax preparation system to prepare their returns. This may be particularly useful for employees of the same company that have the same salary or pay scale, or which have the same title and common tax situations as a result, or other common tax data such that calculation results involving that common tax data of prior returns can be used for current returns of the employees. Thus, embodiments may be utilized to begin or pre-populate tax returns of tens, hundreds and thousands of other employees that have common attributes as another taxpayer.

Yet other embodiments are directed to determining a result of a tax calculation for an electronic tax return that is being prepared, but without performing the tax calculation during preparation of the current electronic tax return. One embodiment involves receiving runtime data of a current electronic tax return of a taxpayer for which a calculation is to be performed based on the received runtime data, e.g., as specified by a directed calculation graph, determining a result of the calculation without performing the calculation; and populating respective portions of the electronic tax return with the runtime data and the result, which may involve populating one or more result nodes of the directed calculation graph.

One embodiment is directed to determining a result of a tax calculation for an electronic tax return that is being prepared, but without performing the tax calculation during preparation of the current electronic tax return, and instead using a result of a prior calculation that was performed during preparation of another taxpayer's tax return.

Another embodiment involves receiving runtime data of an electronic tax return of a taxpayer and populating respective nodes of a graphical data structure with respective runtime data. A function for, or assigned to or linked to a pre-defined groups of nodes of the graphical data structure, is executed. Inputs to the function include runtime data of respective populated nodes of respective pre-defined groups. Outputs generated by executing the function are compared with pre-determined identifiers or signatures. When a function output matches a pre-determined identifier or signature, that pre-determined identifier or signature is used to identify a previously determined result of a calculation, rather than having the tax preparation application used to prepare a current electronic tax return perform a calculation during preparation of the current electronic tax return to determine the same result. In this manner, for the current electronic tax return being prepared, and other electronic tax returns that are at least partially populated for other taxpayers (e.g., those that have yet to begin their tax returns), it is not necessary to perform all calculations required for preparing a current electronic tax return, thus greatly simplifying preparation of electronic tax returns. After the result is determined (versus calculated), a node of a graphical data structure such as a directed calculation graph is populated with the determined result and the determined result is written to the shared data store.

Yet another embodiment is directed to a computer implemented method for determining electronic tax return data that involve receiving runtime data of an electronic tax return of a taxpayer, wherein a calculation is to be performed based on the received runtime data and transforming the received runtime data in a first format into a second format. The second format is used to determine a result of the calculation to be performed, rather than actually performing the calculation, and the determined (versus calculated) result can be used to populate one or more nodes of a directed calculation graph.

In one embodiment, a function that is executed to determine a calculation result rather than execute a calculation during preparation of a current electronic tax return to determine the same result is a hash function. The hash value or output generated by the hash function is compared to pre-determined identifiers in the form of pre-determined hash values such that when a generated hash value matches a pre-determined hash value, an associated previously determined result of a calculation of a current electronic tax return being prepared (or that has yet to be prepared) is determined based at least in part upon the pre-determined hash value, thus eliminating the need to perform the calculation. Otherwise, if the hash value does not match a pre-determined identifier or hash value, then the calculation is executed, leading to a calculated result. A portion of an electronic tax return is populated with the result, whether determined or calculated.

One embodiment is directed to a computer implemented method for determining electronic tax return data of a taxpayer before the taxpayer has begun preparation of an electronic tax return (and which may be before the taxpayer has even purchased a tax preparation program to begin preparation of an electronic tax return). The method is performed by a modular tax preparation system comprising a tax logic agent, a user interface controller, a calculation engine, and a data store shared by the user interface controller, the calculation engine and the tax logic agent. The method comprises the calculation engine reading, from the shared data store, runtime data of an electronic tax return of a first taxpayer and populating respective nodes of a graphical data structure with runtime data. The calculation engine executes respective functions associated with respective pre-defined groups of nodes of the graphical data structure utilizing function inputs of runtime data of the electronic tax return. Execution of a function generates an output, and the calculation engine performs calculations specified by the graphical data structure. A pre-determined calculation result is associated with, linked to, or cross-referenced with, an output of a function, which is associated with a group of nodes that includes runtime data that served as inputs to generate the calculation result. The method further comprises the calculation engine identifying other taxpayers sharing an attribute with the first taxpayer (e.g., same pay scale or pay grade with same employer), receives data of identified other taxpayers (e.g., from other taxpayer employers) and identifies a group of nodes of the graphical data structure that includes runtime data that is the same as received data of identified other taxpayers. The calculation engine executes a function associated with the identified group of nodes to generate a function output, and compares the function output and pre-determined identifiers. When a match is identified, that pre-determined identifier is used by the calculation engine to determine a result of a calculation without performing the calculation. At least a portion of an electronic tax return of another taxpayer is prepared with the determined result and other known data.

Other embodiments are also directed to modular tax preparation systems programmed or configured to perform tax return computation allocation. For example, one embodiment of a modular tax return preparation system comprises a user interface controller and a tax logic agent that is independent of and in communication with the user interface controller, or loosely coupled to the user interface controller, and which share a data store. The user interface controller is configured or programmed to write electronic tax return data to the data store, and the tax logic agent is configured or programmed to read runtime electronic tax return data from shared data store and provide a non-binding suggestion to the user interface controller regarding what to present to the user based at least in part upon the runtime electronic transaction data. The system further comprises a calculation engine, which can read runtime data from and write data to the shared data store, and an arbiter module, which may be associated with, a component or in communication with the calculation engine such that the calculation engine and the arbiter module are cooperatively configured to: read first runtime data of the electronic tax return from the data store, determine a first set of computations to be executed based at least in part upon the first runtime data, communicate with a plurality of remote computing resources through respective networks and selecting at least one remote computing source based at last in part upon pre-determined criteria and attributes of respective remote computing resources, transmit data of the first set of determined computations to be executed to the selected remote computing resource through a network, the selected remote computing resource being configured to execute the first set of determined computations, and receive a first set of results generated by the selected remote computing resource. The results are written to the shared data store and available for reading by the tax logic agent for further non-binding suggestion analysis. Systems may also include the one or more remote computing resources that execute the computations.

Other system embodiments may involve a modular tax preparation system in which modular components are hosted by respective computers and communicate with each other via respective networks such that the tax preparation system is "de-centralized" or "distributed" among various computing systems or resources.

Yet other embodiments are directed to articles of manufacture or computer program products comprising a non-transitory computer readable storage medium embodying one or more instructions executable by one or more computers (e.g., via respective networks for distributed or modular tax preparation systems and remote system components) to implement method embodiments and that may be utilized by various modular components.

In a single or multiple embodiments, the calculation engine writes results to the shared data store to update runtime data in the shared data store to include the prior or first runtime data computation results, and the tax logic reads the updated runtime data for generating non-binding suggestions of a potential topic or question for the user interface controller, which may process the non-binding suggestion and generate an interview screen that includes the question or topic and that is presented to the user. The calculation engine can then again read the runtime data as updated by responses provided by the user via the user interface controller and populate a calculation graph. The arbiter module computing resource analysis can be repeated, and iterations can be performed as results are received, non-binding suggestions are generated and processed, responses are received from the taxpayer. During subsequent iterations, the same or different remote computing resource, or the same or different combinations of remote computing resources may be utilized for computations.

In a single or multiple embodiments, the calculation engine determines computations to be performed based at least in part upon nodes of a directed calculation graph, which may be a directed acyclic graph comprising encoded data dependencies amongst tax concepts or topics and that includes input or leaf nodes comprising data for specific tax-related items, function nodes associated with respective functions, wherein respective input nodes are associated with respective function nodes, and inputs to a function include data of respective associated input nodes, and result nodes associated with respective functions nodes, a result node comprising an output generated by function associated with a function node. Functions that are executed are associated with function nodes linked to or associated with populated input nodes. Results of computations, whether local or remote, can be used by the calculation engine to populate at least one input or leaf node and/or a result node.

In a single or multiple embodiments, remote computing resources are utilized to execute calculation computations only, e.g., calculations of calculation graph functions. According to another embodiment, remote computing resources are utilized to execute logic computations (as distinguished from calculation computations) only as determined by a tax logic agent's analysis of a completeness graph or associated decision table. Other embodiments may involve both calculation and logic computations being performed by remote computing resources. Thus, an arbiter module may be a component of or associated or in communication with one or both of the calculation engine and tax logic agent. Further, calculation and/or logic computations may be performed locally, e.g., for security reasons. Thus, in embodiments in which both logic computations and calculation computations are executed remotely, respective results can be routed directly to the tax logic agent or tax calculation engine, or routed thereto from the arbiter module which may receive the results from a remote computing resource.

In a single or multiple embodiments, criteria for selecting a remote computing resource comprises one or more or all of resource availability, financial cost for performing computations (e.g., based on bidding for spot instances), an amount of time required by a remote computing resource to perform the first set of determined computations, geographic location of resources and security features such as encryption. When using remote computing resource instances, in the event of computing resource interruption, e.g., due to a spot instance price exceeding a bid price, the calculation engine can receive the first subset of results generated during the first instance and the arbiter module can select another remote computing resource that is utilized for remaining computations.

In a single or multiple embodiments, remote computing resource processing is performed automatically, whereas in other embodiments, the user interface controller receives authorization from the user to utilize remote computation.

In a single or multiple embodiments, when a shared data store includes data of multiple taxpayers, respective computations of respective electronic tax returns of respective different taxpayers can be executed by one or more remote computing resources. Results of remote computations, whether for one taxpayer or multiple taxpayers, may be utilized to populate multiple portions or groups of nodes of a single calculation graph or multiple calculation graphs, and remote computations may be topic-specific such that a calculation graph or portion thereof for that topic is populated with results generated by a remote computing resource.

In certain embodiments, the arbiter module is located remotely relative to the calculation engine and in communication with the calculation engine through a network, and the remote arbiter module serves as an intermediary between the calculation engine (and/or tax logic agent) and remote computing resources. Given the modular nature of the tax preparation system, modules of the tax preparation system may also execute on one or multiple computers. For example, the calculation engine may execute on a first computer and accessing a second computer hosting the shared data store through a network. The arbiter module and the calculation engine (and/or tax logic agent) may execute on the same computer or different computers.

Another embodiment is directed to processing data of an electronic tax return during preparation of the electronic tax return by performing computations locally and remotely given sensitive nature of certain data. One embodiment involves a modular tax preparation system including tax logic agent, user interface controller calculation engine and shared data store components. The method comprises the modular tax preparation system identifying first runtime data comprising different subsets of runtime data, at least one subset of runtime data indicated as being sensitive data, whereas data of the other subset is not. The method further comprises the modular tax preparation system locally executing computations involving the first subset of first runtime data and generating first results. The modular tax preparation system, e.g., by an arbiter module, communicates with a plurality of remote computing resources through respective networks and selects at least one remote computing source based at last in part upon pre-determined criteria and respective attributes of respective remote computing resources. The method further comprises the modular tax preparation system transmitting the second subset of first runtime data (which was not indicated to include or involve sensitive data) to the at least one selected remote resource through a network, which executes computations utilizing the second subset of first runtime data and generating second results, which are received by the modular tax preparation system. Results generated remotely can then be merged with other results such as results generated by local execution or processed separately by the tax logic agent for respective non-binding suggestions.

A further embodiment is directed to a computer implemented method for processing data of an electronic tax return during preparation of the electronic tax return in which computations, including those involving sensitive data, are performed remotely. In such embodiments, a modular tax preparation system in which tax logic is independent of user interface functions, identifies first runtime data comprising a first subset of first runtime data and a second subset of first runtime data, the first subset of first runtime data is indicated to be sensitive data, the second subset of first runtime data not being identified as sensitive data. The system communicates with remote computing resources through respective networks and selects a first computing source for computations involving sensitive data and a second computing resource for computations involving other runtime data. Respective runtime data is transmitted to through respective networks to respective selected remote resources, which execute respective computations utilizing respective first and second runtime data subsets. Respective first results and second results are generated and transmitted to the modular system, which merges the data and update the runtime data in the shared data store. In a single or multiple embodiments, sensitive data is personal identification data (such as name, social security number) and/or private data (such as residence, date of birth, account numbers, etc.)

Sensitive data considerations may involve a completeness directed graph that is analyzed or scanned (but not populated) by the tax logic agent to determine, given current runtime data stored in a cache used by the tax logic agent, other conditions for a specific topic have been satisfied or addressed and which ones still need to be addressed in order to complete a topic or have a fileable tax return. Corresponding non-binding suggestions are generated for the user interface controller, which writes data to the shared data store for reading by the calculation engine.

In a single or multiple embodiments, logic computations involving sensitive data can be processed differently, e.g., in a more secure manner, which may involve more expensive computing resources or higher spot instance prices, or computing resources having better security features or that are at certain geographic locations compared to other logic computations that can be performed by less expensive and less secure computing resources (based on security features of a computing resource and/or computing resource location).

For purposes of identifying sensitive data, whether utilized with a completion graph or included in a calculation graph, sensitive runtime data can be stored in the shared data store with an associated tag, which may be specified by the user or by the modular tax return preparation system. For example, the user may be presented with an interview screen generated by the user interface controller and that includes a menu from which the user can select or specify sensitive data. In another embodiment, tagging can be performed automatically by the user interface controller (e.g., with reference to a pre-determined list or table of data to be tagged as sensitive), which then writes the gas to the shared data store and/or part of a non-binding suggestion generated by the tax logic agent.

In a single or multiple embodiments, all computations, including those that involve sensitive data, are performed by a single remote computing resource. The single remote computing resource may also execute calculation computations for the calculation engine. An arbiter module may be utilized to select a remote computing resource, and when results are received, logic computation results are directed to the tax logic agent, and calculation computing results are directed to the calculation engine. In another embodiment, logic computations, including computations involving sensitive data, are performed by a first remote computing resource, whereas calculation computations are performed by a different remote computing resource.

In a further embodiment, logic computations involving sensitive are allocated among different remote computing resources. For example, rather than a single remote computing resource executing computations involving name, address and account numbers, computations can be allocated among different remote computing resources to "break up" the sensitive data (e.g., logic computations involving first name are processed by one remote computing resource and logic computations involving account number are processed by another remote computing resource such that sensitive data is distributed among multiple remote computing resources, and certain computations may be performed locally, to prevent or minimize negative consequences resulting from a hack of a remote computing resource.

In a single or multiple embodiments, a result of a calculation that was determined (versus calculated) for a current electronic tax return being prepared for the first electronic tax return utilizing the pre-determined identifier is a result that was previously calculated for another electronic tax return (not the current electronic tax return being prepared). Thus, for example, an initial or prior taxpayer may have prepared an electronic tax return and filed the electronic tax return with a tax authority or is still working on the return. That electronic tax return data, which was prepared by executing various calculations to generate calculated results, serves as a source or foundation of result data. This result data is referenced by an intermediate function output (e.g., hash value or other identifier generated by execution of a hash with runtime data inputs). In this manner, and in contrast to known tax preparation systems, for future electronic tax returns when other users with the same input tax data, the results that were previously calculated for the first or prior taxpayer are referenced by a hash value, identifier or pointer. Thus, when another taxpayer has runtime data inputs that result in the same hash value, that hash value is used to look up other tax data for that other user thus avoiding to need to perform the same calculations for the other user since the results for those inputs are already referenced in the database. In this manner, an electronic tax return can be at least partially populated for the other, subsequent taxpayer, even before that other taxpayer has started such that embodiments may be used to begin an electronic tax return for taxpayers, and embodiments may be particularly beneficial in instances in which taxpayers are employed by the same employer, share the same title or have a common pay schedule (e.g., as utilized by government employers).

For example, when a calculation engine reads runtime data of a second electronic tax return of a second taxpayer, nodes of a graphical data structure such as a directed calculation graph that includes input or leaf nodes, tax function nodes associated with respective tax functions and result nodes, and that is utilized for the second electronic tax return are populated with the runtime data, pre-defined groups of nodes of the graphical data structure used for the second electronic tax return and function outputs based on those inputs are compared with pre-determined identifiers, and for a match, determined calculation results can be used to populate input and/or result nodes and written to the shared data store, which his used to populate the second electronic tax return with calculation results without having to perform the calculations. According to one embodiment, this involves a pre-determined identifier cross-referencing the determined result in a data structure such as a table or database of pre-determined identifiers and associated previously calculated results of other electronic tax returns.

BRIEF DESCRIPTION OF THE DRAWINGS

FIG. 6A illustrates a decision table based on or derived from a completeness graph of FIG. 5C, FIG. 6C illustrates an example of how a rule engine may process a decision table when determining which question to select;

FIG. 23 illustrates an example of a data structure for identifying calculation results during preparation of a current electronic tax return without performing the calculation in the current electronic tax return by cross-referencing pre-determined identifiers that are based on respective function outputs and respective previously determined calculation results;

DETAILED DESCRIPTION OF ILLUSTRATED EMBODIMENTS

Embodiments involve computerized systems, computer-implemented methods, and articles of manufacture or computer program products for determining which computing resources will be utilized to execute computations for preparation of an electronic tax return, e.g., whether to perform computations locally or remotely, and if remotely, which remote computing resources will be utilized and how computations are allocated to computing resources. Embodiments also involve doing so while accounting for whether data that is being processed is sensitive data, such as personal identification data or private data. Computations involving sensitive data may be performed locally, remotely if certain criteria area satisfied, or distributed among multiple remote resources in order to "break up" sensitive data so that even if sensitive data is stolen from a remote computing resource, the harm from the data breach is limited given that sensitive data was distributed. For example, calculation computations may involve numbers, Boolean operators and arithmetic operations, whereas logic computations involving selection of topics or questions may involve more sensitive or private data such as personal identification data or other personal data and thus require more secure communications and computing resources. Thus, more secure remote computing resources can be selected for sensitive data, whereas less secure remote computing resources can be selected for non-sensitive logic computations and calculation computations.

Embodiments also involve how such computations can be used to determine data of certain aspects of taxpayers, rather than being required to perform numerical calculations, such that when taxpayers with common data inputs or attributes are identified, electronic tax returns can be at least partially populated utilizing an intermediate function or reference to results generated by prior calculations based on input data reflecting the common attributes. Further aspects of embodiments are described with reference to FIGS. 1A-25.

Figure 1A:
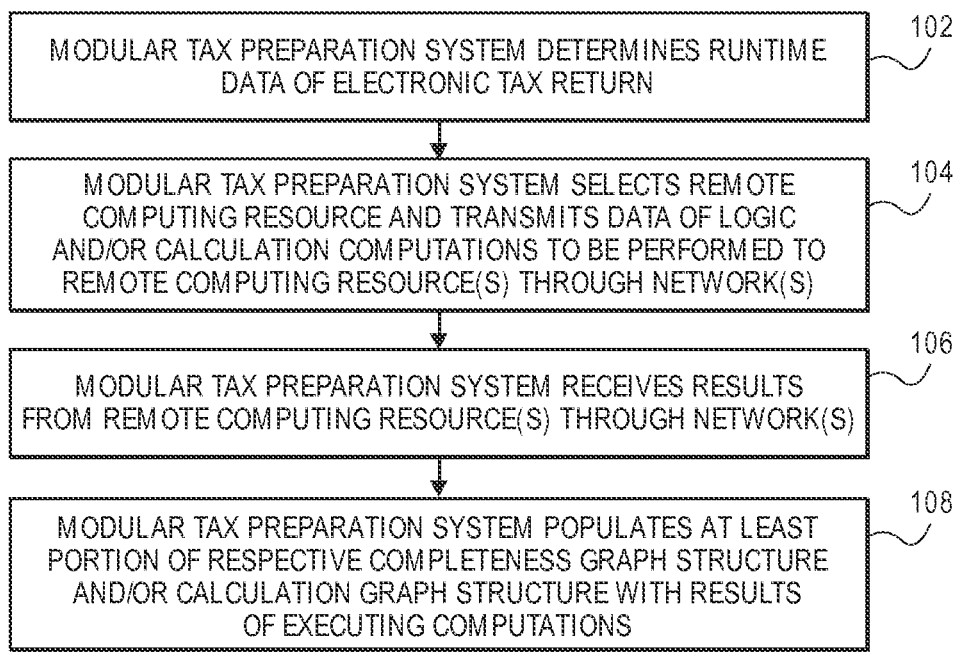
FIG. 1A is a flow diagram of one embodiment of a computer-implemented method for selecting remote computing resources for performing computations of an electronic tax return prepared by a modular tax preparation application.
Figure 1B:
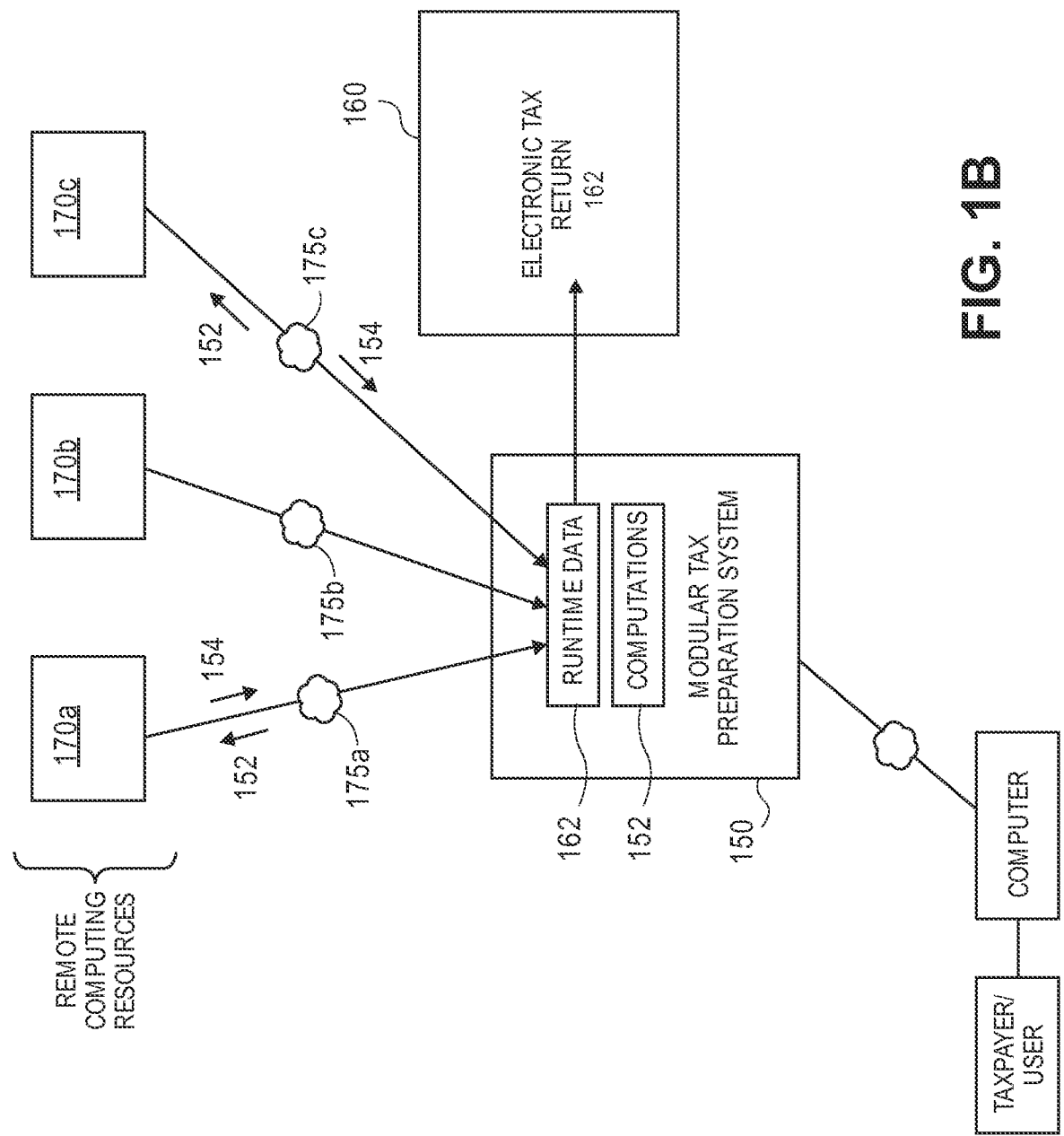
FIG. 1B is a system block diagram illustrating how a computerized modular tax preparation application can utilize remote computing resources to execute tax return computations.

Referring to FIGS. 1A-B, in a computer-implemented method performed according to one embodiment, at 102, a modular tax preparation system 150, which may be utilized by a taxpayer and accessed through a network by a taxpayer computer, determines runtime data 162 of an electronic tax return 160, and at 104, selects one or more remote computing resources 170 (170a-c are illustrated). Data of computations 152 to be performed, which may involve logic computations (152l) ("l" indicating "logic") and/or calculation computations (152c) ("c" indicating "calculation") that are to be performed, is transmitted to one or more selected remote computing resource(s) 170 through network(s) 175 (175a-c are illustrated). A selected remote computing resource 170 executes computations 152. At 106, modular tax preparation system 150 receives results 154 generated by execution of the computations 152 from remote computing resource(s) 170 through network(s) 175, and results 154 are used to prepare or populate at least a portion of the electronic tax return 160, which may involve populating at least portion of a completeness graph structure and/or calculation graph structure with results 154 of logic computations 152l and/or calculation computations 152c as described in further detail below.

Figure 2A:
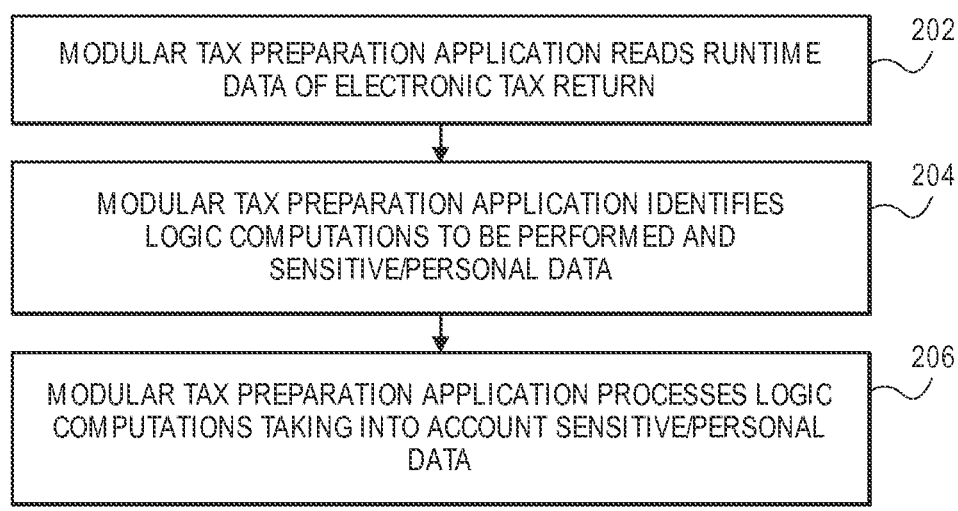
FIG. 2A is a flow diagram of one embodiment of a computer-implemented method for performing computations of an electronic tax return prepared by a computerized modular tax preparation application that accounts for data indicated to be sensitive data.
Figure 2B:
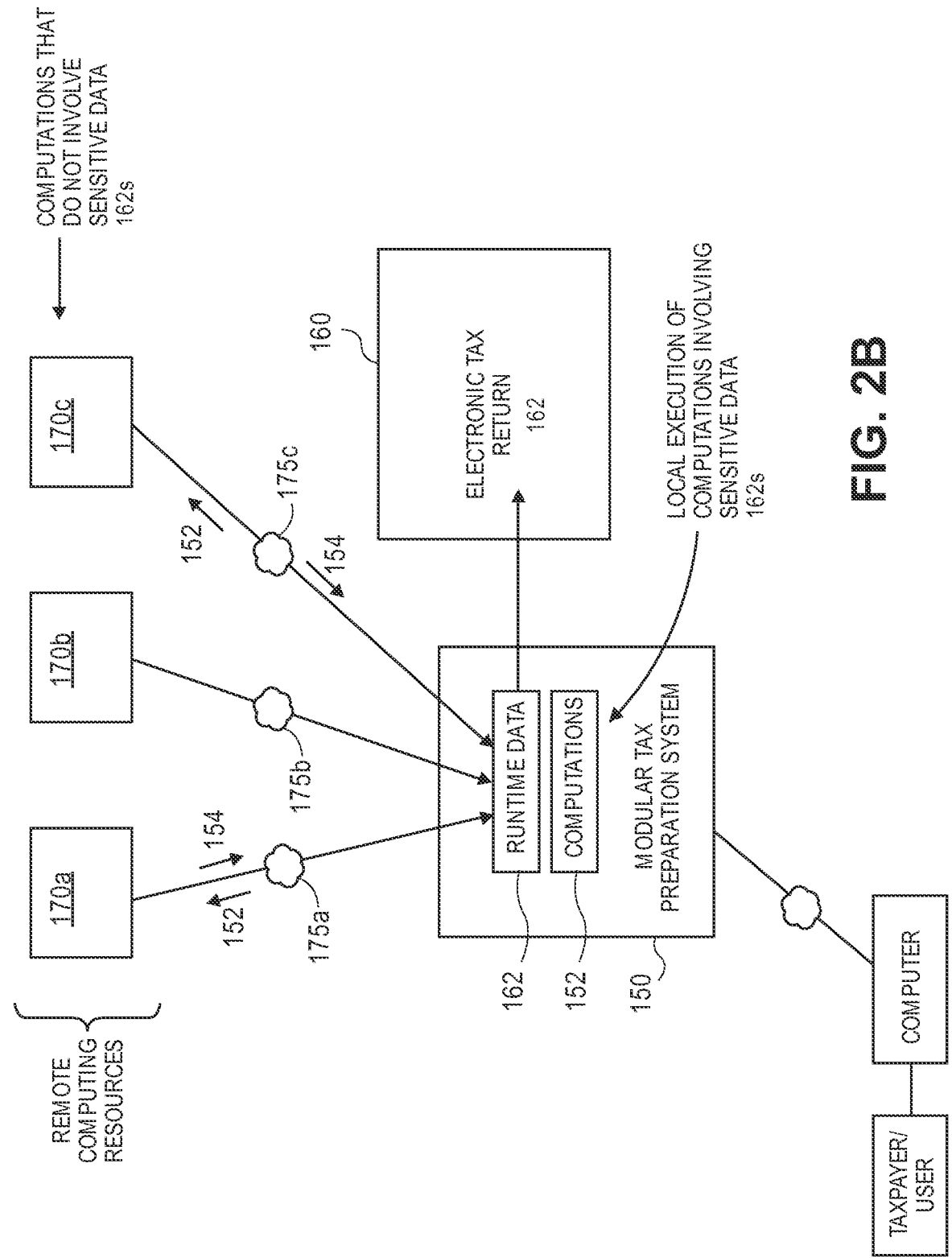
FIG. 2B is a system block diagram illustrating how a modular tax preparation application can utilize different computing resources to execute tax return computations while accounting for sensitive data.

Referring to FIGS. 2A-B, in a computer-implemented method performed according to another embodiment, at 202, modular tax preparation application 150 reads runtime data 162 of electronic tax return 160, and at 204, identifies logic computations 152l (versus calculation computations 152c) to be performed and sensitive/personal data (162s) involved in the logic determinations 152l. At 206, modular tax preparation application 150 processes logic computations 152l taking into account sensitive data 162s. This may involve, for example, executing logic computations 152l involving sensitive data 162s locally and executing other computations with other remote computing resources 170 or allocating logic computations 152l among different computing resources 170 such that sensitive data 162s is not provided to a single computing resource 170 and is instead distributed among multiple computing resources 170, e.g., multiple remote computing resources 170 or by local/remote distribution.

Figure 3A:
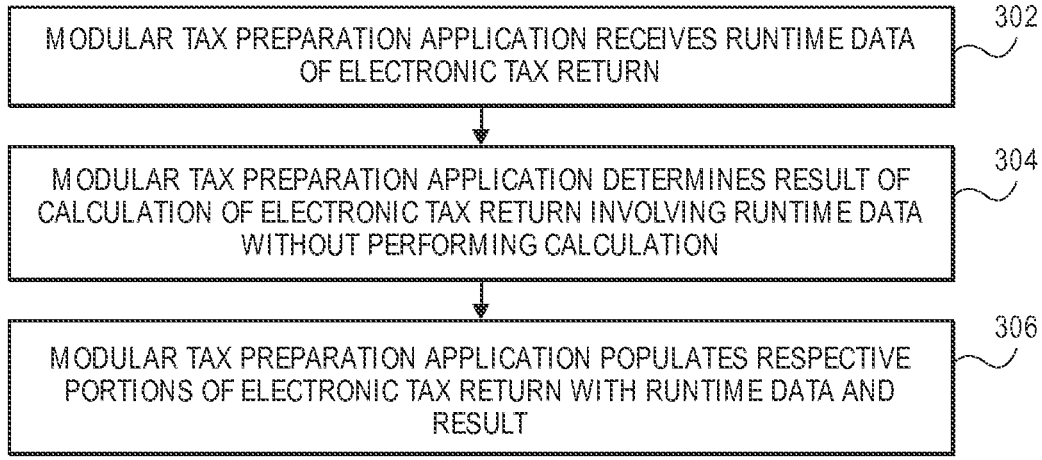
FIG. 3A is a flow diagram of one embodiment of a computer-implemented method for determining results of a calculation for an electronic tax return without performing the calculation during preparation of the electronic tax return.

Referring to FIG. 3A, in a computer-implemented method performed according to another embodiment, at 302, modular tax preparation application 150 receives or determines runtime data 162 of electronic tax return 160, and at 304, determines a result 310 of a calculation involving runtime data 162 without performing the calculation. In such embodiments, the calculation to be performed is not even required. Instead, the result 310 of such unexecuted calculation is determined based on data used to populate nodes of a graphical data structure and utilizing data of different taxpayers, which may be electronic tax return data or data about the user that is known or determined before preparation of the current electronic tax return has begun. At 306, the modular tax preparation application populates respective portions of an electronic tax return with runtime data and determined (versus calculated) result.

Figure 3C:
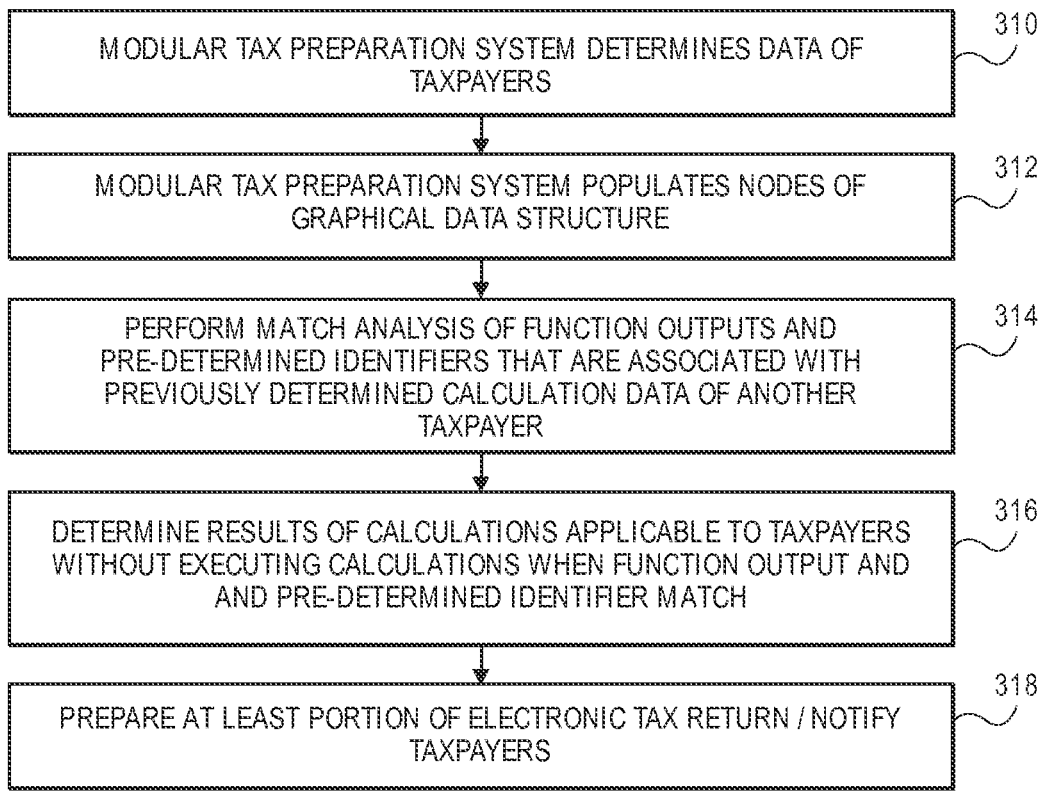
FIG. 3C Is a flow diagram of one embodiment of a computer-implemented method for beginning or preparing at least a portion of electronic tax returns of taxpayers utilizing modular tax preparation applications constructed according to embodiments that determine calculation results applicable to taxpayers without performing the calculations.
Figure 3B:
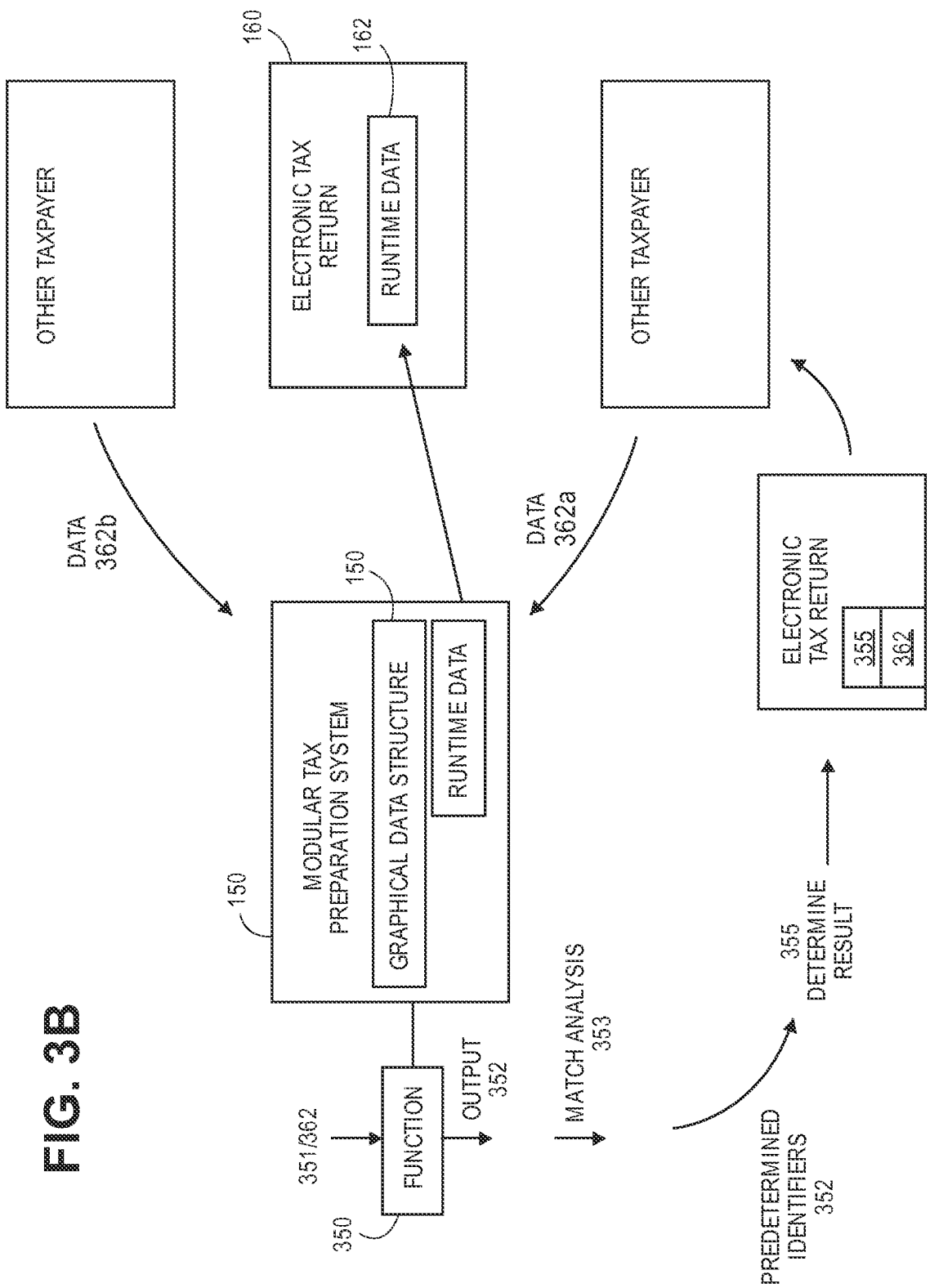
FIG. 3B is a system block diagram illustrating how a computerized modular tax preparation application can utilize to determine results of a calculation for an electronic tax return without performing the calculation during preparation of the electronic tax return.

For example, referring to FIGS. 3B-C, at 310, modular tax preparation system 150 determines data 362 (362a, 362b of different taxpayers illustrated) and at 312, populates nodes of a graphical data structure 150. An intermediate function 350, such as a hash function, is associated with groups of nodes of the graphical data structure, receives inputs 351, and execution of the function 350 with those inputs 351 generates a result 352. At 314, a match analysis 353 of function outputs 352 and pre-determined identifiers 354 associated with previously determined calculation data of another taxpayer is performed. At 316, modular tax preparation system 350 determines results 355 of calculations applicable to taxpayers without executing calculations when a function output 352 and pre-determined identifier 354 match. At 318, at least a portion of an electronic tax return 360 can be prepared or taxpayers can be notified that that electronic tax returns 360 have already been started for them, even before the other taxpayers have begun their own preparation of a return, and even before they purchase or launch a tax preparation application.

Further details regarding embodiments and aspects of embodiments are described with reference to FIGS. 4-25. FIGS. 4-10 illustrate one embodiment of a modular tax preparation system in which tax logic is separate or independent of user interface functions such that these components are loosely connected or divorced from each other, and outputs in the form of suggestions generated by a logic component may be processed by a user interface component and is thus "non-binding" upon the user interface component.

Figure 4:
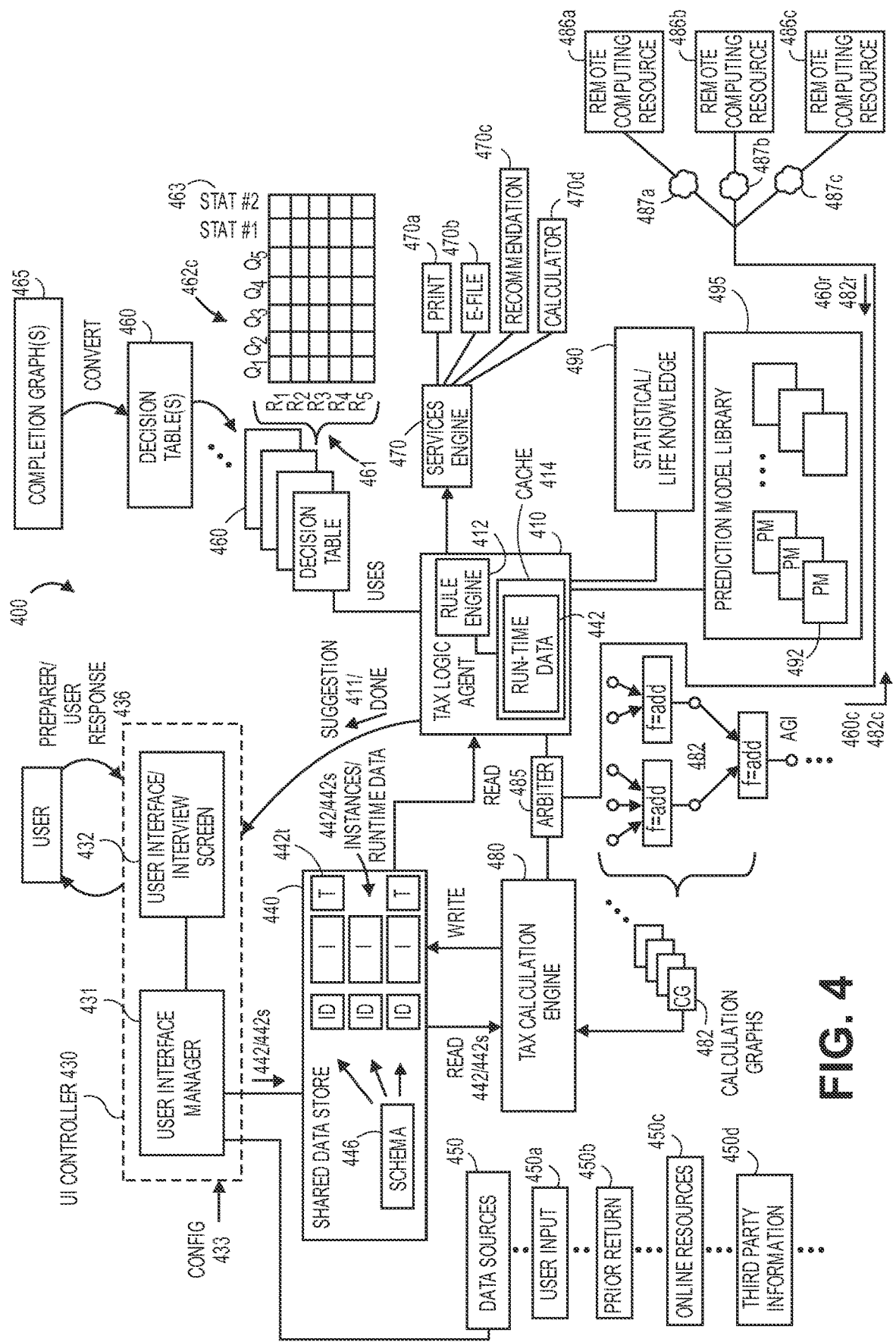
FIG. 4 illustrates a block diagram of a computerized modular tax preparation system constructed according to one embodiment and illustrating system components and associated graph data structures and decision tables and how such system is configured for selective allocation of computations to different computing resources.

FIG. 4 illustrates one embodiment of a system 400 incorporating special purpose arbiter module or engine 420 and that involves tax logic agent 410 generating non-binding suggestions 411 including candidate questions 462 that are provided to UI controller 430 for consideration and possible processing or an indication that a certain topic or the electronic tax return is "done." As shown in FIG. 4, the illustrated embodiment of system 400 includes tax logic agent 410 comprising or executing a declarative rule engine or processor 412. Rule engine or processor scans or analyze decision tables 460 using runtime or instance data 442. Rule engine 412 may utilize a fact cache 414 to generate either non-binding suggestions 411 for additional candidate question(s) 462 to present to a user or "Done" instructions which indicate that completeness has occurred for a particular topic or for an electronic tax return as a whole such that no additional input for the topic or electronic tax return is needed. Rule engine 412 may, for example, operate in the form a Drools expert engine. Other declarative rules engines 412 may be utilized and a Drools expert rule engine is provided as one example of how embodiments may be implemented. Tax logic agent 410 may be implemented as a dedicated module or engine that is executed by or as part of the tax return preparation application and may be embodied as a programmed subroutine that is executed by a processor or controller as described herein. Further, given the modular nature of system components, components may be incorporated into a tax return preparation application or be executed as a distributed system, e.g., on two or more different computing systems through respective networks. For example, tax logic agent 410 determinations can be determined separately of UI controller 430 functions, which are performed separately of calculation engine 480 processing, one or more or all of which may be managed by respective independent computers through respective networks such that communications between components described herein may be performed through respective networks between respective computing devices. Thus, embodiments provide for a distributed tax return preparation system in which UI determinations and interview screen presentment are independent of tax logic and tax calculations and that may also be distributed among multiple computing devices.

In certain embodiments, and as illustrated in FIG. 4, tax logic agent 410 reads runtime data 442 from shared data store 440, and UI controller 430 and tax calculation engine 480 are also in communication with shared data store 440. Tax logic agent 410 can read runtime data 442 from shared data store 440, UI controller 430 can write data to shared data store 440, and calculation engine 480 can read data from shared data store 440, perform a calculation using a calculation graph 482, and write a calculation or result 442r ("r" indicating "result") to shared data store 440.

Tax logic agent 410 is operable to receive runtime or instance (I) data (generally, runtime tax return data 442) based on a "dictionary" of terms of data model or schema 446 (generally, schema 446). Schema 446 specifies, defines or lists tax-related concepts or terms. For example, terms of a schema may involve names, type or category and hierarchy such as "name," "social security number," "citizenship," "address," "employer," "interest," "dividends," "mortgage," "deduction," "tax credit," "capital gain," etc. An instance 442 is instantiated or created for the collection of data received and for each term or topic of schema 446. Schema 446 may also specify data constraints such as a certain format of questions and answers (e.g., answer is binary (Y/N) or a number/value). It will be understood that schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of schema 446 that can be utilized in embodiments.

Instances can be identified and distinguished (e.g., for multiple instances of the same topic or tax form), and a generated identifier (ID) for an instance (I) based on the schema when writing data to shared data store 440. Thus, instances 442 and suggestions 411 that may involve the same term or element of schema 446 are distinguished. For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 442r or non-binding suggestion 411, for example, and which ones are not.

With continuing reference to FIG. 4, runtime electronic tax return data 442 stored in shared data store 440 is used to eventually populate corresponding fields of an electronic tax return or electronic tax forms or documents and may be received from or based on data from various data sources 450a-d (generally, source 450). Examples of sources 450 include user input or manual entry of data into an interview screen 432 generated by UI controller 430, data imported from a prior year electronic tax return (e.g., from a tax authority with which the prior year electronic tax return was filed, a locally stored prior year return file, or a return file from another tax preparation application), data from online resources (such as online social networks such as facebook.com, linkedin.com or other online resources) and third parties databases or resources (such as government databases or documents, such as property tax records, Department of Motor Vehicle (DMV) records, etc. Tax logic agent 410 reads runtime electronic tax return data 442 from shared data store 440 and utilizes or executes rules 461 expressed in a data structure such as decision table 460 based on completeness graph 465 to determine, based on currently available runtime electronic tax return data 442, what other data or answers are still needed in view of unanswered questions 462. In other words, tax logic agent 410 determines what conditions of a rule 461 still need to be satisfied in order to reach a conclusion or completeness status for subject matter or topic of decision table 460, and in turn, which questions or topics 462 of decision table 460 or other data structure should be presented to user in order to obtain that other needed data to reach a conclusion. For example, a rule 461 specified by decision table 460 may be based on a tax authority requirement or law, and may generally specify that If X, and Y, and Z, then Conclusion.

Rules 461 may involve various topics. "Tax" rules 461 that are utilized by rule engine 412 may specify types of data or tax documents that are required, or which fields or forms of the electronic tax return should be completed. One simplified example is if a taxpayer is married, then the electronic tax return is required to include information about a spouse. Tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of the data model or schema 446.

Rules 461 are utilized or scanned by tax logic agent 410 to identify or narrow which questions 462, as provided in decision table 460, are identified as potential or candidate questions 462 to be presented to user. This may involve utilizing rules 461 based on one or more associated data structures such as decision table 460, which is based on a completion graph 465. Completion graph 465 recites, for example, requirements of tax authority or tax authority rules or laws. Decision table 460 may be used for invalidation of potential questions 462 or topics and input or runtime data 442 requirements.

FIGS. 5A-C and 6A-C illustrate graphically how tax legislation/tax rules 500 are broken down into completeness graph 465 and tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5A:
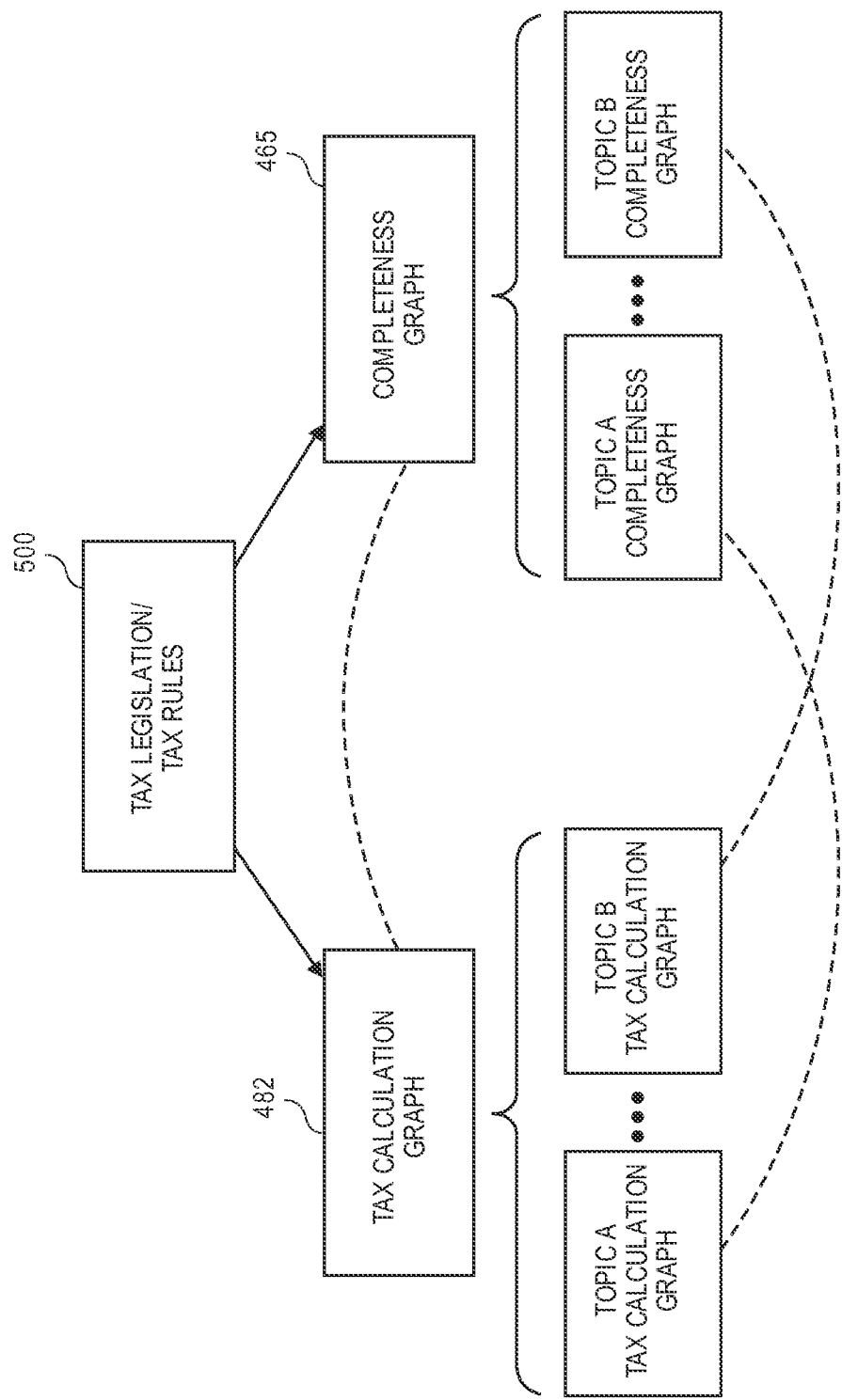
FIG. 5A schematically illustrates how tax legislation/tax rules are parsed and represented by a completeness graph and a tax calculation graph according to embodiments.

As shown in FIG. 5A, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, completion graph 465 may reference or be associated with a particular schema 446 element and associated instance or runtime data 442 in shared data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed for a particular topic or for a tax return as a whole such that the electronic tax return can be prepared and ultimately filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 5B:
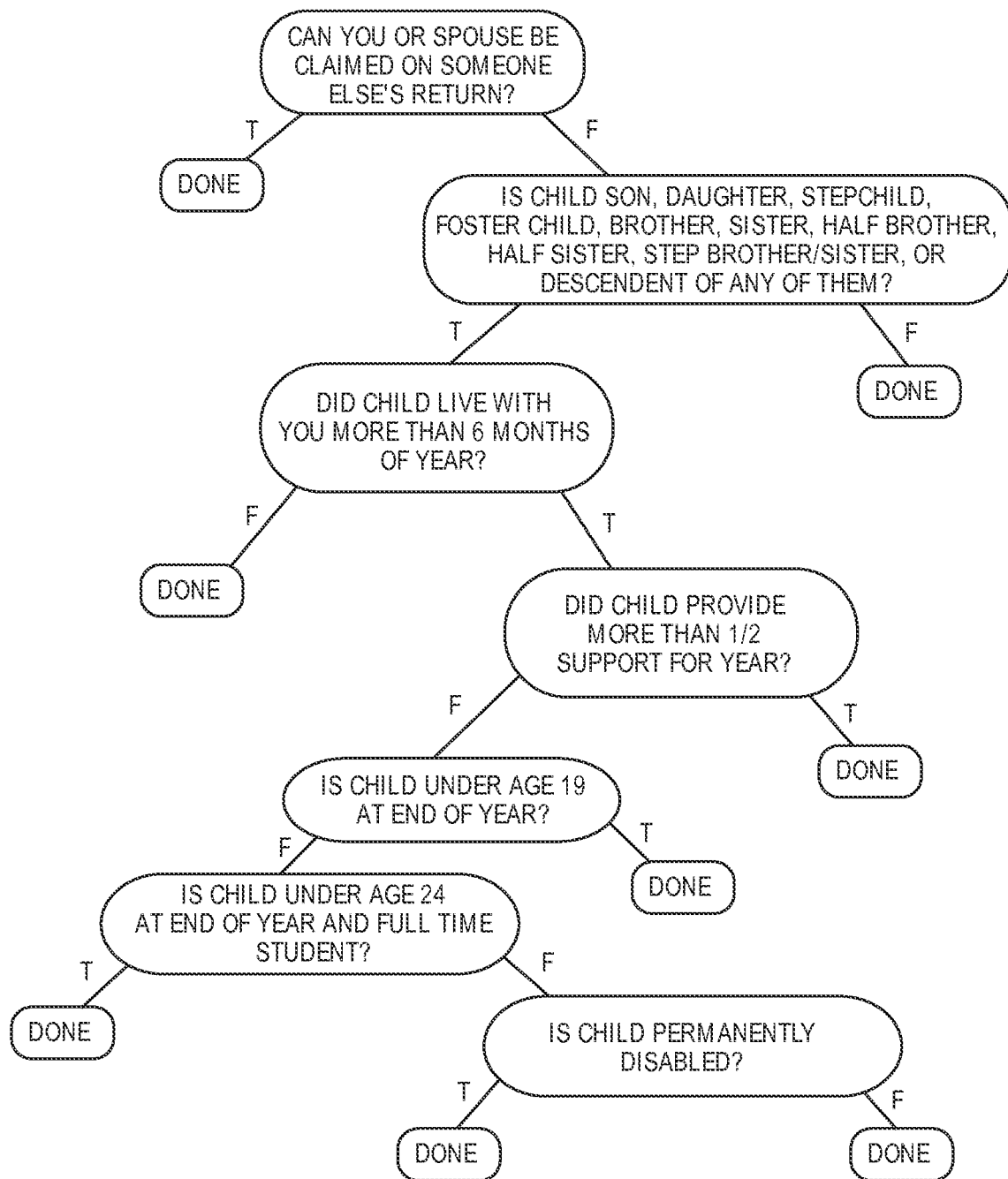
FIG. 5B illustrates an example of a simplified version of a completeness graph related to a qualifying child for purposes of determining deductions for federal income tax purposes.
Figure 5C:
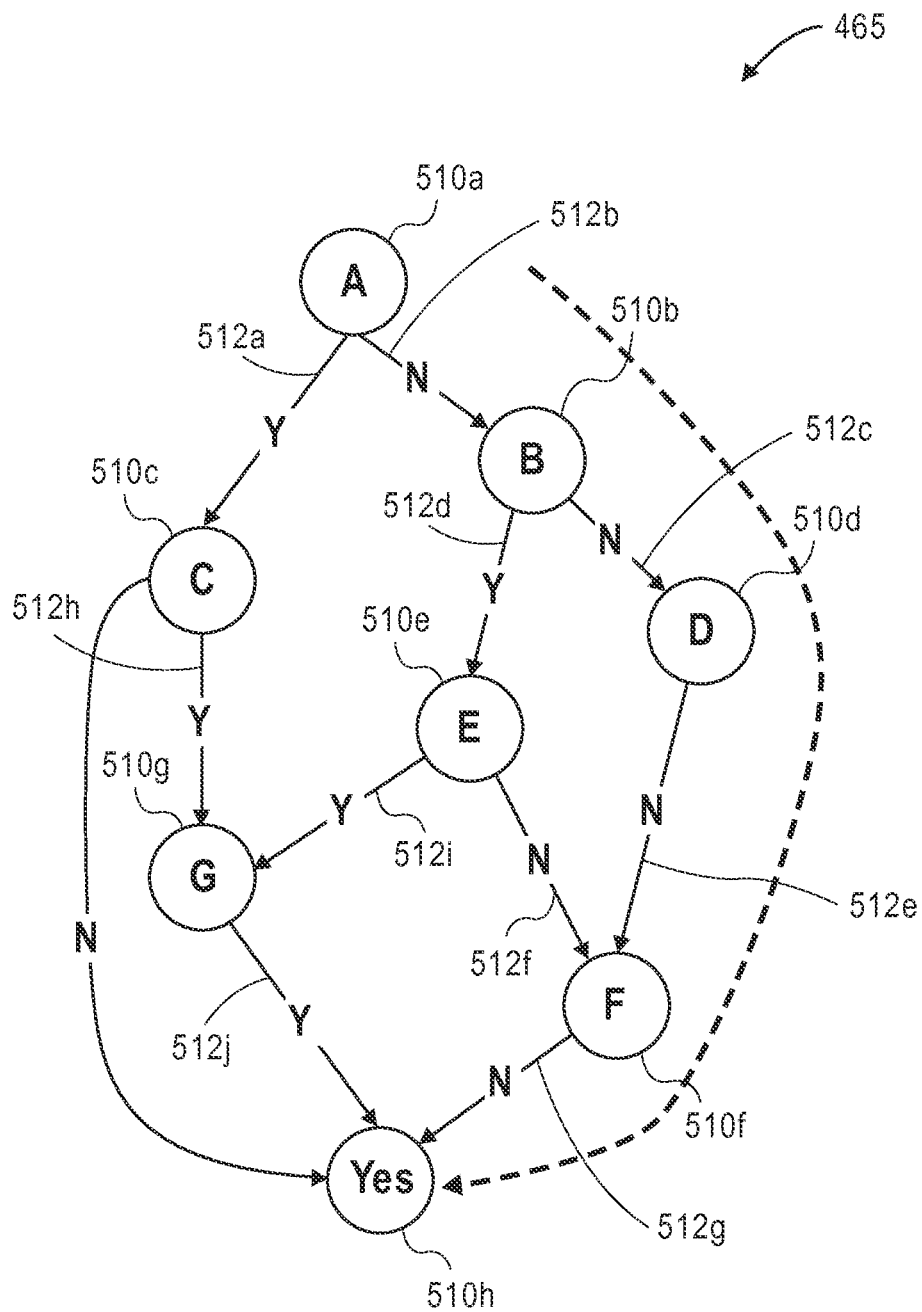
FIG. 5C illustrates an example of a directed graph or completeness graph.

Completeness graph 465 and tax calculation graph 482 represent graphical data structures that can be constructed in the form of tree. FIG. 5C generally illustrates completeness graph 465 in the form of a tree structure including nodes 510a-g, in which node 510a is a beginning or start node, a "Yes" or termination node 510h indicating completion, and arcs 512 a-j representing different possible answers and the relationship between different nodes 510 or questions depend on a basic or general version of a completeness graph 465 for the particular topic, such as determining whether a child qualifies as a dependent for federal income tax purposes. FIG. 5B illustrates an example of a flow-chart based representation of questions, and a more complete flow chart-based representation of questions related to determining a "qualified child" may be found in U.S. patent application Ser. No. 14/097,057, entitled "Methods Systems and Computer Program Products for Applying Generates Rules for Personalized Interview Experience,", the contents of which are incorporated herein by reference as though set forth in full.

Each node 510 in the completion graph 465 of FIG. 5C contains a condition that in this example is expressed as a Boolean expression that, in the illustrated embodiment, can be answered in the affirmative or negative. Arcs 512 that connect each node 510 illustrate the answers and dependencies between nodes 510, and the combination of arcs 512 in completeness graph 465 illustrates the various pathways to completion. A single arc 512 or combination of arcs 512 that result in a determination of "Done" represent a pathway to completion. As generally shown in FIG. 5C, there are several pathways to completion.

More specifically, FIG. 5C generally illustrates completeness graph 465 that includes beginning node (Node A) 510a, intermediate nodes (Nodes B-G) 510b-g and a termination node (Node "Yes" or "Done") 510h. Each of the beginning node 510a, and intermediate nodes 510b-g represents a question. Inter-node connections or arcs 512 represent response options. In the illustrated embodiment, each inter-node connection 512 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 5B, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 510 with a large number of pathways to completion. However, by many branches or lines within the completeness graph 465 can be ignored, for example, when certain questions internal to the completeness graph 465 are answered that eliminate other pathways, or other nodes 510 and arcs 512, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Referring to FIG. 6A, decision table 460 generated by transformation of completeness graph 465 illustrated in FIG. 5C reflects the question-and-answer flow of completeness or directed graph 465. In the illustrated example, rows of decision table 460 define rules 461a-e (e.g., Rules R1-R5 as shown in FIG. 6A), and columns of the decision table 460 indicate topics or questions 462a-g (Q1-Q5 shown in FIG. 4 OR Qa-Qg as shown in FIG. 6A). During processing, decision table 460 is scanned by tax logic agent 410 to determine which answers 464 or which aspects of a rule 461 or condition elements are included in received runtime data 442 stored in cache 414 and read from shared data store 440. Tax logic agent 410 determines how much the runtime data 442 completes decision table 460 and determines or selects candidate questions 462 to be presented to user, answers to which would complete respective rule 461 conditions reflected in decision table 460.

Thus, tax logic agent 410 uses decision tables 460 to analyze the runtime data 442 and determine whether a tax return is complete, and each decision table 460 created for each topic or sub-topic is scanned or otherwise analyzed to determine completeness for each particular topic or sub-topic. In the event that completeness has been determined with respect to each decision table 460, then rule engine 412 outputs a "done" instruction to UI controller 430. If rule engine 412 does not output a "done" instruction that means there are one or more topics or sub-topics that are not complete, which, as explained in more detail below, presents interview questions to a user for answer. Tax logic agent 410 identifies decision table 460 corresponding to one of the non-complete topics or sub-topics and, using the rule engine 412, identifies one or more non-binding suggestions 411 to present to UI controller 430. Non-binding suggestions 411 may include a listing of compilation of one or more questions from one or more decision tables 460.

Figure 6B:
FIG. 6B illustrates another embodiment of a decision table that incorporates statistical data that may be used for determining a likelihood or probability of an answer to a question of the decision table according to embodiments.

The following pseudo code generally expresses how a rule engine 412 functions utilizing a fact cache 414 based on the runtime canonical data 442 (FIG. 4 generally illustrating cache 414 including runtime data 442) or the instantiated representation of the canonical tax schema 446 at runtime and generating non-binding suggestions 411 provided as an input to UI controller 430. As described in U.S. application Ser. No. 14/097,057 incorporated herein by reference, data such as required inputs can be stored to fact cache 414 so that the needed inputs can be recalled at a later time, and to determine what is already known about variables, factors or requirements of various rules 461:

Rule engine (412)/Tax Logic Agent (TLA) (410)
    // initialization process
    Load_Tax_Knowledge_Base;
    Create_Fact_Cache; While (new_data_from_application)
    Insert_data_into_fact_cache;
    collection=Execute_Tax_Rules; // collection is all the
        fired rules and
    corresponding conditions
    suggestions=Generate_suggestions (collection);
    send_to_application(suggestions);

In one embodiment, as shown in FIG. 6B, statistical data 463 (which may be appended as columns to rule-question decision table 460 shown in FIG. 6A, may be received from or based on data collected by life knowledge module 490 described in further detail below) indicates how likely a question or topic 462 is to be relevant to a user given a set of runtime data 442 and may be utilized by rule engine 412 when determining which candidate question or topic 462 to select. Instead of, or in addition to, statistical data, embodiments may also involve tax logic agent 410 executing one or more predictive models 492, which may be part of a predictive model library 495, for purposes of determining how likely a question or topic 462 is to be relative to a given user based on input runtime data 442. Examples of predictive models 492 that may be utilized for this purpose include predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 460 may include columns that contain statistical data in the form of percentages and that are analyzed by rule engine 412. Column (STAT1 shown in FIG. 6B) may contain a percentage value that indicates taxpayers under the age of thirty-five where Rule$_1$ is satisfied. Another column (STAT2 shown in FIG. 6B) may contain a percentage value that indicates taxpayers over the age of thirty-five where Rule$_1$ is satisfied. Any number of additional columns could be added to the decision table 460 and statistics do not have to relate to an age threshold or grouping. Statistical data 463 may be used by the tax return preparation application to determine which of the candidate questions ($Q_A$-$Q_G$) 462 should be selected by tax logic agent 410 for presentation to or asked of user. Statistical data 463 may be compared to one or more known taxpayer data fields (e.g., age, income level, tax filing status, geographic location, or the like) such that the question that is presented to the user is most likely to lead to a path to completion. Candidate questions 462 may also be excluded or grouped together and then presented to the user to efficiently minimize tax interview questions during the data acquisition process. For example, questions 462 that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

For example, life knowledge module 490 may indicate that taxpayers residing within a particular zip code are more likely to be homeowners than renters. Tax logic agent 410 may use this knowledge to weight particular topics or questions related to these topics when processing rules 461 and questions 462 and generating non-binding suggestions 411. Tax logic agent 410 may also receive or otherwise incorporate information from life knowledge module 490 for these purposes. Life knowledge module 490 contains statistical or probabilistic data and/or results generated by predictive models related to the current or other users of the tax return preparation application and/or other taxpayers.

Non-binding suggestions 411 generated by tax logic agent 410 may be, for example, a question, declarative statement, identification of a topic and may include a ranked listing of suggestions 411. Ranking may be weighted in order of importance, relevancy, confidence level, or the like. According to one embodiment, statistical data or results generated by predictive models may be incorporated by tax logic agent 410 to be used as part of the candidate question ranking which, in turn, may be used by tax logic agent 410 to assign a ranking to the non-binding suggestions 411 generated by tax logic agent 410.

For example, questions 462 about home mortgage interest may be promoted or otherwise given a higher weight for users in particular zip codes or income levels. Statistical knowledge 490 or results generated by execution of predictive models 492 may apply in other ways as well. For example, tax forms often require a user to list his or her profession. These professions may be associated with transactions that may affect tax liability. For instance, a taxpayer may list his or her occupation as "teacher." Life knowledge module 490 may contain data that shows that a large percentage of teachers have retirement accounts, and in particular, 403(b) retirement accounts. This information may then be used by tax logic agent 410 when generating its non-binding suggestions 411. For example, rather than asking generically about retirement accounts, the non-binding suggestion 411 can be tailored directly to a question about 403(b) retirement accounts. According to one embodiment, candidate question scoring and ranking is used to select candidate questions 462 to use to generate a non-binding suggestion 411, and according to another embodiment, ranking is also used to impose a ranking of non-binding suggestions 411 themselves for reference by UI controller 430.

For example, candidate questions 462 of a non-binding suggestion 411, and non-binding suggestions 411 themselves, may be ranked as described in U.S. application Ser. No. 14/462,058, filed Aug. 18, 2014, entitled "Computer Implemented Methods Systems and Computer Program Products for Ranking Non-Binding Suggestions During Preparation of Electronic Tax Return and U.S. application Ser. No. 14/461,982, filed Aug. 18, 2014, entitled "Computer Implemented Methods Systems and Computer Products for Candidate Question Scoring and Ranking During Preparation of Electronic Tax Return, the contents of all of which are incorporated herein by reference as though set forth herein in full. Such ranking may be based on, for example, a type of probability, estimate, assumption or inference determination, which may involve statistical analysis or execution of a predictive model using electronic tax return data as inputs.

Data that is contained within life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by life knowledge module 490. This information may be periodically refreshed or updated to reflect the most up-to-date relationships. Generally, the data contained in the life knowledge module 490 is not specific to a particular tax payer but is rather generalized to characteristics shared across a number of tax payers although in other embodiments, the data may be more specific to an individual taxpayer.

In one embodiment, rule engine 412 reads runtime data 442 and uses runtime data 442 as answers or inputs to decision table 460 to eliminate rules 461 that may apply which, is used to eliminate questions 462 from consideration rather than requiring the user to step through each question of a pre-determined sequence of questions in order to conclude that a particular tax situation or topic applies to the user.

For example, referring to FIG. 6C, and continuing with the example of decision table 465 shown in FIG. 6A, runtime data 442 that is known is used to determine which rows or rules 461 to cross out in decision table 460. In the illustrated example, if it is known from runtime data 442 that the answer to Question A is "Y" then rules 461 R3-R5 involving a "N" answer to Question A are not applicable, and those rows or rules 461 of decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462 that require answers based on the current runtime data 442 include Questions C and G. Thus, rule engine 412 uses decision table 460 to select one or more rules 461 and determine or select one or more candidate questions 462 that are unanswered in view of current runtime or instance data 442 and that should be presented or asked of the user to proceed to completion.

Tax logic agent 410 provides to UI controller 430 a non-binding suggestion 411 comprising a selected question or topic 462 to be addressed. In the illustrated embodiment, UI controller 430 includes a UI or user experience manager 431 that determines how to process the non-binding suggestions 411 with selected questions or topics 462 and generates an interface or interview screen 432 for the UI or selects an interview screen of the UI based on the question or topic 462 of the non-binding suggestion 411. For ease of explanation, reference is made to interview screen generator 432 or resulting interview screen 432. UI controller 430 may include suggestion resolution element, a generator element, and an interview screen management element or flow/view management" module, as described in U.S. application Ser. No. 14/097,057, filed Dec. 4, 2013, entitled Methods Systems and Computer Program Products for Applying Generated Rules for Personalized Interview Experience", the contents of which are incorporated herein by reference as though set forth in full.

For example, as described in the above-identified incorporated application, a configuration file 433 of UI controller 430 may specify whether, when and/or how non-binding suggestions 411 are processed. For example, a configuration file 433 may specify a particular priority or sequence of processing non-binding suggestions 411 such as now or immediate, in the current interview screen, in the next interview screen, in a subsequent interview screen, in a random sequence (e.g., as determined by a random number or sequence generator), or that UI controller 430 should wait for additional data and/or until a final review stage initiated by the user. As another example, this may involve classifying non-binding suggestions 411 as being ignored. A configuration file 433 may also specify content (e.g., text) of the interview screen that is to be generated based at least in part upon a non-binding suggestion 411.

UI manager 431 of UI controller 430 may include a generator element that is in communication with a suggestion element and that generates the resulting user interaction or experience or creates or prepares an interview screen 432 or content thereof based on the output of the suggestion element and input received from the interview screen management element. For this purpose, generator element may communicate with the interview screen management element, which manages a library of visual assets. Visual assets may be pre-programmed interview screens that can be selected by the interview screen management element and provided to the generator element for providing resulting interview screen 432 or content or sequence of interview screens 432 for presentation to the user. Visual assets may also include interview screen 432 templates, which are blank or partially completed interview screens 432 that can be utilized by the generation element to construct an interview screen on the fly during runtime in the event that an appropriate pre-programmed or pre-determined interview screen or other visual asset is not available or cannot be identified by the interview screen management element.

More specifically, in one embodiment, as described in the incorporated application, UI manager 431 of the UI controller 430 includes a suggestion resolution element or "Suggestion Resolver," a generator element 342 or "Generator," and an interview screen management element 343 or "Flow/View Management." The suggestion resolution element is responsible for resolving the strategy of how to respond to incoming non-binding suggestions 411. For this purpose, the suggestion resolution element may be programmed or configured internally, or based on interaction configuration files 433, which specify whether, when and/or how non-binding suggestions 411 are processed. For example, a configuration file 433 may specify a particular priority or sequence of processing non-binding suggestions 116 such as now or immediate, in the current interview screen 432, in the next interview screen 432, in a subsequent interview screen 432, in a random sequence (e.g., as determined by a random number or sequence generator), or that the UI manager 431 should wait for additional data and/or until a final review stage initiated by the user. As another example, this may involve classifying non-binding suggestions 411 as being ignored. A configuration file 433 may also specify content (e.g., text) of the interview screen 123 that is to be generated based at least in part upon a non-binding suggestion 411.

The generator element is in communication the suggestion element and generates the resulting user interaction or experience or creates or prepares an interview screen 432 or user interface or content thereof based on the output of the suggestion element and input received from the interview screen management element. For this purpose, the generator element may communicate with the interview screen management element, which manages a library of visual assets. Visual assets may be pre-programmed interview screens that can be selected by the interview screen management element and provided to the generator element for providing the resulting interview screen or content or sequence of interview screens for presentation to the user. Visual assets may also include interview screen templates, which are blank or partially completed interview screens that can be utilized by the generation element to construct an interview screen 432 on the fly during runtime in the event that an appropriate pre-programmed or pre-determined interview screen or other visual asset is not available or cannot be identified by the interview screen management element. The following exemplary pseudocode describes system components and data described above:

Suggestion Resolution Element
// Take a suggestion and consult the behavior configuration to
// decide which ones the UI will handle
Suggestions=Get_suggestions_from_TLA;
New_list=Rank_and_Filter(Suggestions, Configuration_File);
Generation Element
For each item in New_list
UI_asset=Flow_View_Manager(item);
If UI_asset==NULL // if Flow_View_Manager does not have any ready
to go asset for the item
Template=Get_Template(item) // identify a template based on the item e.g. its type
UI_asset=Construct_UI_Asset(Template, item)
End
End
Interview Screen Management Element
Provide look-up capability to return UI asset (flow/view) if there is any, for given model field For ease of explanation and illustration, reference is made to UI controller 430, which, given the use of data structures described herein, permits the UI controller 430 to be loosely connected or even divorced from the tax logic agent 410 and tax calculation engine 480 and the data used in the tax calculations that is stored in shared data store 440.

Figure 7:
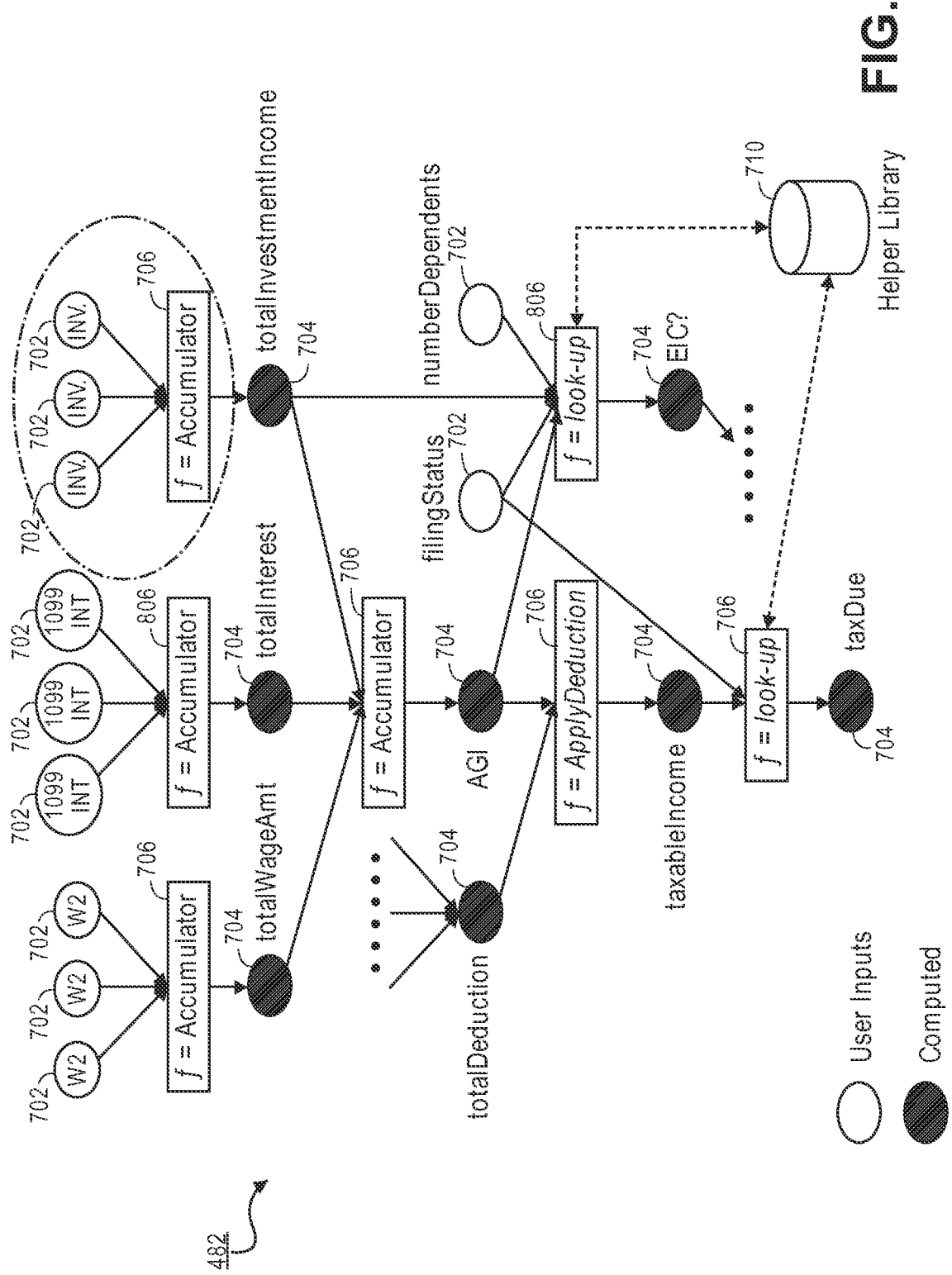
FIG. 7 illustrates an example of a calculation graph that is populated with runtime data and that includes input nodes, function nodes and result nodes.

With continuing reference to FIGS. 4 and 7, tax calculation engine 480 reads current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by tax logic agent 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, tax calculation engine 480 will run calculation graphs 482 again to calculate a new AGI value, which would then be stored to shared data store 440.

FIG. 7 illustrates one example of a tax calculation graph 482. Tax calculation graph 482 semantically describes data dependent tax operations that used perform a tax calculation in accordance with the tax code or tax rules. Tax calculation graph 482 in FIG. 7 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 7, various nodes 702 are input nodes. Examples of input nodes 702 in this particular example include data obtained from W-2 forms, data obtained from 1099-INT forms, data obtained from other investment income (INV), filing status, and number of dependents. Typically, though not exclusively, input nodes 702 are populated with user inputs. That is to say the user taxpayer will enter this information from a user interface as described herein. In other embodiments, however, nodes 702 may be populated with information that is automatically obtained by the tax preparation software. For example, in some embodiments, tax documents may be imaged or scanned with relevant data being automatically extracted using Optical Character Recognition (OCR) techniques. In other embodiments, prior tax returns may be used by the tax preparation software to extract information (e.g., name, potential dependents, address, and social security number) which can then be used to populate nodes 702. Online resources such as financial services websites or other user-specific websites can be crawled and scanned to scrape or otherwise download tax related information that can be automatically populated into nodes 702. Additional third party information sources such as credit bureaus, government databases, and the like can also be used by the tax preparation software to obtain information that can then be populated in to respective nodes 702.

In still other embodiments, values for nodes 702 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for nodes 702 may be estimated.

Still other internal nodes referred to as functional nodes 704 semantically represent a tax concept and may be calculated or otherwise determined using a calculation function 706, which generates a calculation result that is to be utilized in the electronic tax return (as opposed to other intermediate "functions" described below such as a hash function). Functional node 704 and the associated function 706 define a particular tax operation. For example, as seen in FIG. 7, operation refers to total wage income and is the result of the accumulator function 706 summing all W-2 income from input nodes 702. Functional node 704 may include a number in some instances. In other instances, the functional node 704 may include a response to a Boolean expression such as "true" or "false." Functional nodes 704 may also be constant values in some instances. Some or all of these functional nodes 704 may be labelled as "tax concepts" or "tax topics." The combination of a functional node 704 and its associated function 706 relate to a specific tax operation as part of the tax topic.

Interconnected function nodes 704 containing data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability. For example, examples of such commonly reoccurring functions 706 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 706 that is used to compute or calculate a tax liability is stored within a data store 710 which in some instances may be a database. The various functions 706 that are used to semantically describe data connections between function nodes 704 can be called upon by the tax preparation software for performing tax calculations. Utilizing these common functions 706 greatly improves the efficiency of the tax preparation software can be used by programmer to more easily track and follow the complex nature of the ever-evolving tax code. The common functions 706 also enables easier updating of the tax preparation software because as tax laws and regulations change, fewer changes need to be made to the software code as compared to prior hard-wired approaches.

Tax calculation graph 482 and the associated function nodes 704 and functions 706 can be tagged and later be used or called upon to intelligently explain to the user the reasoning behind why a particular result was calculated or determined by the tax preparation software program. Functions 706 can be de-coupled from a specific narrow definition and instead be associated with one or more explanations. Examples of common functions 706 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Function 706 may also include any number of mathematical or other operations. Examples of functions 706 include summation, subtraction, multiplication, division, and comparisons, greater of, lesser of, at least one of, calling of look-ups of tables or values from a database 710 or library as is illustrated in FIG. 7. It should be understood that the function nodes 704 in the tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 704 may be found in multiple locations within the tax calculation graph 482. Taxable income is another example of such a function node 704.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. A smart tax logic agent 410 running on a set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

In the embodiment illustrated in FIG. 4, UI controller 430 also includes or utilizes an identity generator module that generates an identifier (ID) for an instance (I) to be generated based on schema 446 of shared data store 440. Thus, embodiments involve an ID generator that generates identifier (I) for instance (I) independently of shared data store 440 or processing element of or utilized by shared data store 440 to generate instances, and before instance has been generated from schema 446. Further, in the embodiment illustrated in FIG. 4, embodiments involve UI controller 430 including ID generator to generate instance identifier and later receive non-binding suggestion 411 with that same instance identifier for continuing reference by UI controller 430 when processing suggestions 411 and writing results 442r or electronic tax return data 442 to shared data store 440. Thus, embodiments, uniquely identify instances and non-binding suggestions 411, which may involve the same term or element of schema 446.

For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 481 or suggestion 411, for example, and which ones are not.

Figure 8:
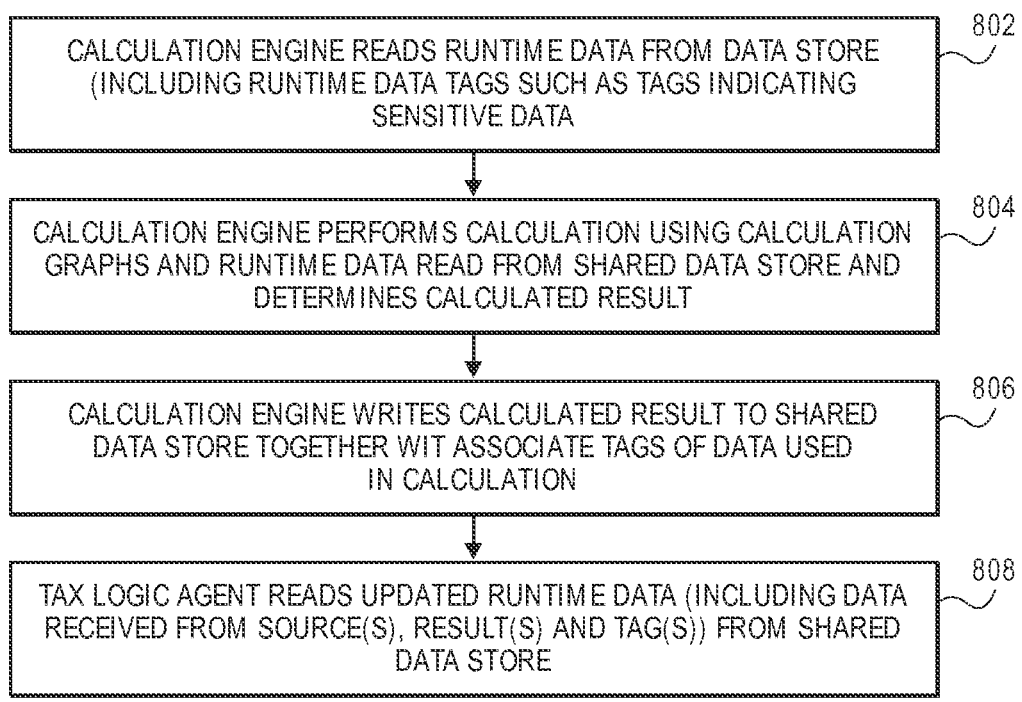
FIG. 8 is a flow diagram illustrating processing by a calculation engine of a computerized modular tax preparation application including processing of runtime data read from a shared data store and generating results that are written back to the data store.

With continuing reference to FIG. 4, and with further reference to FIG. 8, at 802, calculation engine 480 reads runtime data 442 from shared data store 440 (including any runtime data tags 442t such as tags 442t identifying data as "sensitive" data such as personal identification data (e.g., name, social security number of taxpayer, spouse or dependent) or other private data (such as address, account number or demographic data) and whether data 442 in shared data store 440 is original/unconfirmed runtime data, confirmed runtime data, corrected runtime data. At 804, calculation engine 480 uses calculation graphs 482 and runtime data 442 read from shared data store 440 and determines a calculation result 442r ("r" referring to result). At 808, calculation engine 480 writes result 442r to shared data 440 store together with associated tags 442t of electronic tax return data used in the calculation.

Figure 9:
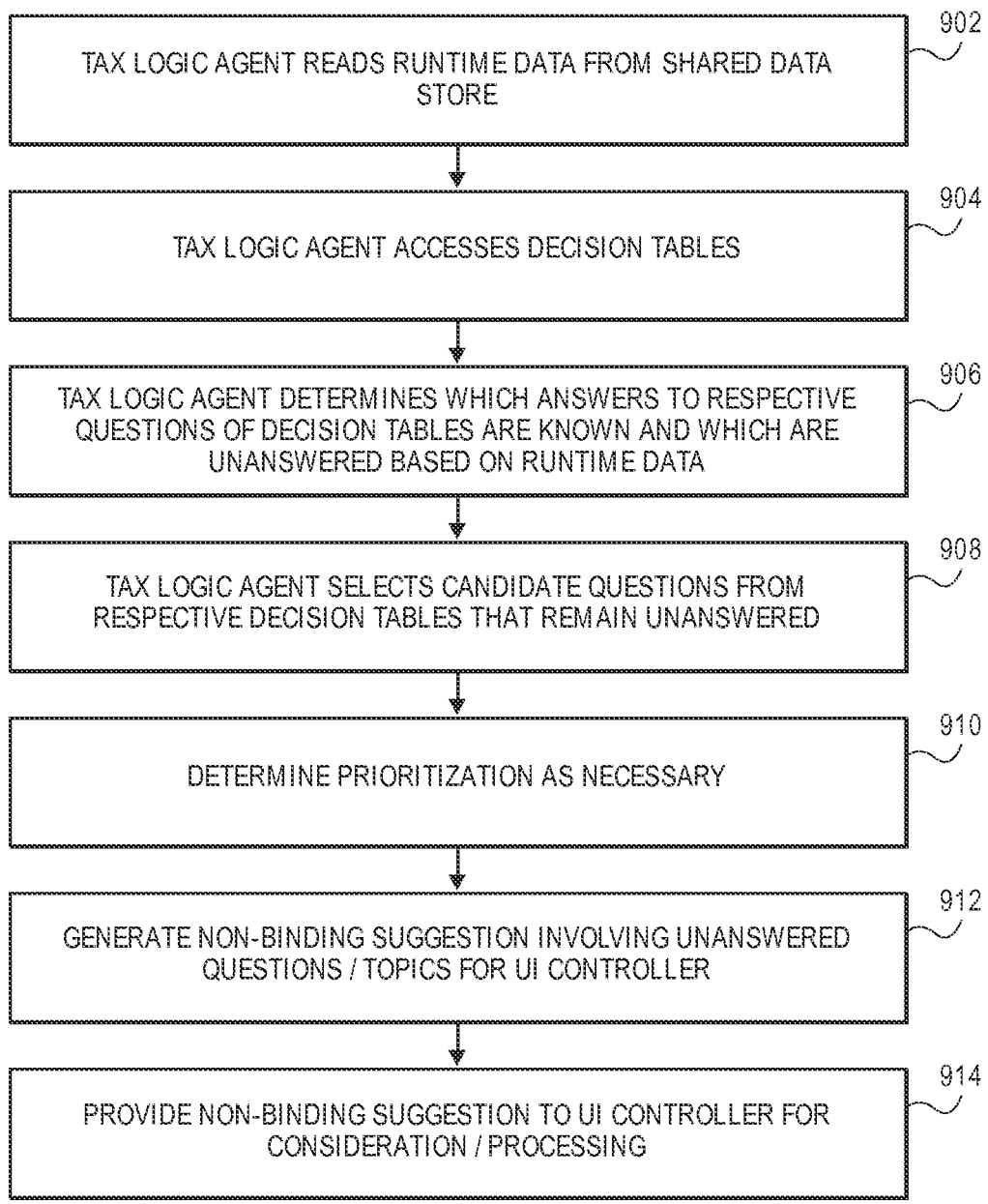
FIG. 9 is a flow diagram illustrating processing by a tax logic agent of a computerized modular tax preparation application that involves reading runtime data including results generated by calculation engine from a shared data store and analyzing a decision table to identify subject matter for non-binding suggestions.

At 808, and with further reference to FIG. 9, tax logic agent 410 reads updated runtime data 442 (including electronic tax return data 442 received from source(s) 450, result(s) 442r, and any associated tag(s) 442t from shared data store 440) from shared data store 440, and at 904, tax logic agent 410 accesses decision tables 460, determines which answers to respective questions 462 of decision table(s) 460 are known based on runtime data 442 at 906, and determines which selected unanswered questions 462/topics are based at least in part upon runtime data 442 including any tags 442t. At 908, tax logic agent 410 selects candidate question from decision table(s) 460 that remain unanswered given the runtime data 442, determines prioritization as necessary at 910 (e.g., prioritize unanswered questions 462 associated with suspect data so that user can confirm or correct suspect data), and at 912, generates non-binding suggestions 411 involving unanswered questions topics and/or for UI controller 430. At 914, non-binding suggestions 411 are provided to UI controller 430 for processing.

Figure 10:
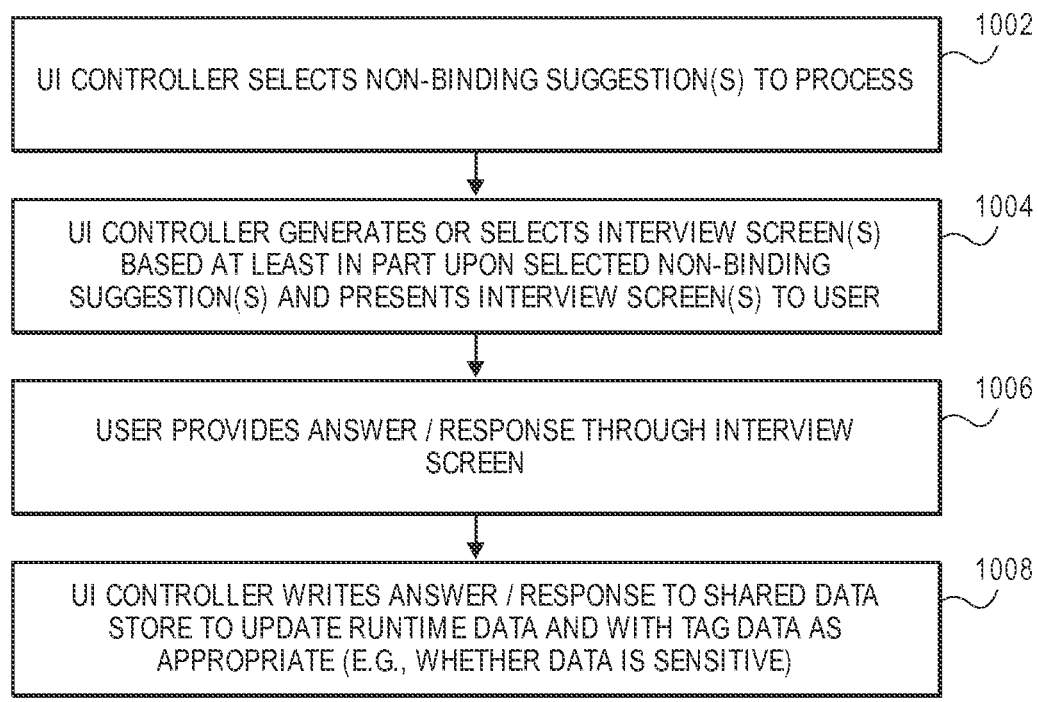
FIG. 10 is a flow diagram illustrating processing by a user interface controller of a computerized modular tax preparation application that involves processing non-binding suggestions generated by the tax logic agent and writing data received from the user and electronic sources and writing received data to a shared data store.

Referring to FIG. 10, at 1002, UI controller 430 selects non-binding suggestion(s) 411, e.g., according to a configuration file 433, and at 1004, generates or selects interview screen(s) 432 based at least in part upon selected non-binding suggestion(s) 411 and presents interview screen to user. At 1006, the user provides answer/response 436 through interview screen 432, and at 1008, UI controller 430 updates active runtime data 442 maintained by shared data store 440. UI controller 430 updates runtime data 441 maintained by shared data store 440 and updates electronic tax return data tags 441t as necessary. UI controller 430—calculation engine 480—tax logic agent 410 processing is repeated until a state of completion with UI controller 430 writing data to shared data store 440, calculation engine 480 reading data from shared data store 440, tax logic agent 410 reading data from shared data store 440 and generating non-binding suggestions 411 for consideration by UI controller 430.

Having described embodiments of a modular tax preparation system that may be utilized in embodiments, the following descriptions provide further details regarding how components of such a modular tax preparation system may be utilized for embodiments involving selection of computing resources for performing logic and/or calculation computations, accounting for data tagged as sensitive data, determining calculation results during preparation of an electronic tax return without performing calculations during preparation of that electronic tax return or as part of preparation of that electronic tax return, and determining electronic tax return data of other users and proceeding to prepare an electronic tax return.

Figure 11:
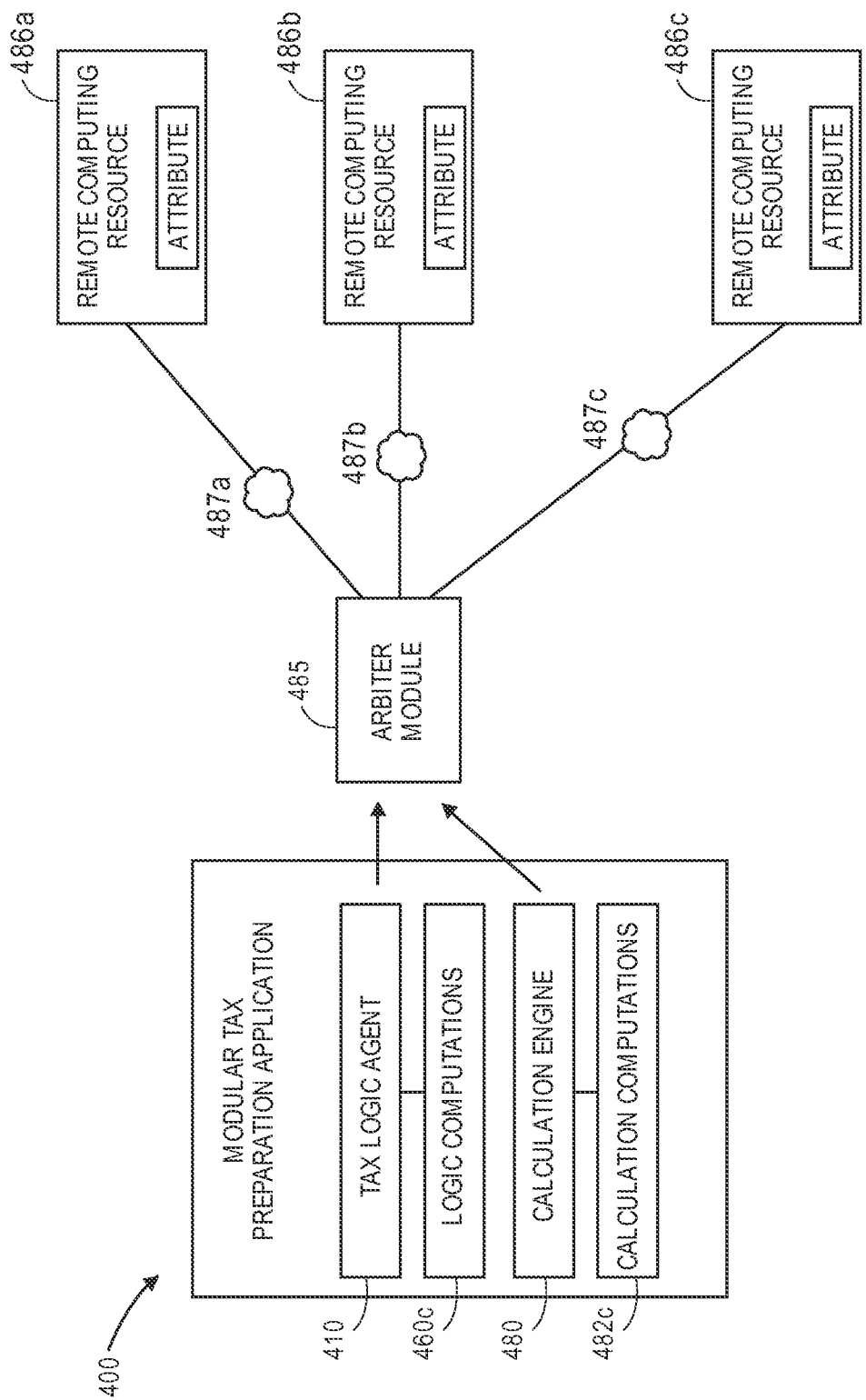
FIG. 11 is a system block diagram of a computerized modular tax preparation application that includes or is in communication with an intermediate arbiter module that selects remote computing resources for executing computations.

With continuing reference to FIG. 4, and with further reference to FIG. 11, according to one embodiment, an arbiter module 485 is a component of or associated with one or both of calculation engine 480 and tax logic agent 410. Arbiter module 485 determines how to allocate logic computations 460c ("c" referring to logic "computations" involving decision table 460 based on completeness graph 465) and/or calculation computations 482c ("c" referring to calculation "computations" of calculation graph 482) among remote computing resources 486a-c (remote computing resource 486) that are accessed through respective networks 487a-c (network 487).

Logic computations 460c, as described above with reference to FIGS. 5A-C and 6A-C involving a completeness graph 465, decision table 460 and tax logic agent 410. Tax logic agent 410 executes logic computations 460c by utilizing or scanning a decision table 460 to identify or narrow which questions 462, as provided in decision table 460, are identified as potential or candidate questions 462 to be presented to the user based on runtime data 442/fact cache 414. This may involve utilizing rules 461 based on one or more associated data structures such as decision table 460, which is based on a completion graph 465, which recites, for example, requirements of tax authority or tax authority rules or laws.

In contrast to logic computations 460c, and as described above with reference to FIG. 7, calculation computations 482c involve tax calculation graph 482. In the illustrated embodiment, tax calculation graph 482 includes input nodes 702, function nodes 704 and result nodes 706 that are populated (vs. cache 414 that stores data for tax logic agent 410 and analyzes decision table 460). Input nodes 702 are populated with user inputs and/or information that is automatically obtained by the tax preparation software or based on a calculation, functional nodes 704 that semantically represent a tax concept and may be calculated or otherwise determined using a function 706, and result nodes. Interconnected function nodes 704 may contain data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability.

In the illustrated embodiment, arbiter module 485 serves as an intermediary and communicates with various computing resources 486 to determine which computing resource 486 will execute certain logic and/or calculation computations 460c, 482c, which may involve particular nodes or groups of nodes, nodes or groups of nodes for a particular topic (which may be in a single or extend across multiple graphs). Further, while FIG. 11 illustrates one example of how embodiments may be implemented in which a tax preparation system includes tax logic agent 410, calculation engine 480 and arbiter module 485, other system configurations may also be utilized give the modular nature of components.

For example, other embodiments involve a distributed/networked configuration in which different modular components are hosted by respective computing devices and communicate through respective networks 487. As another example, in another system configuration, tax logic agent 410, calculation engine 480, user interface controller 430 and arbiter module 485 components are hosted by a computing device, and shared data store 440 is hosted by another computing device and accessible by a network, and computing resources 486 are accessible through respective networks 487. For ease of explanation, reference is made generally to UI controller 430, tax logic agent 410, calculation engine 480, shared data store 440, arbiter module 485 and remote computing resources 486 and respective networks 487, but it will be understood that give the modular nature of tax preparation system embodiments and the ability to separate components from each other given the unique processing employed, that various system configurations may be utilized.

Figure 12:
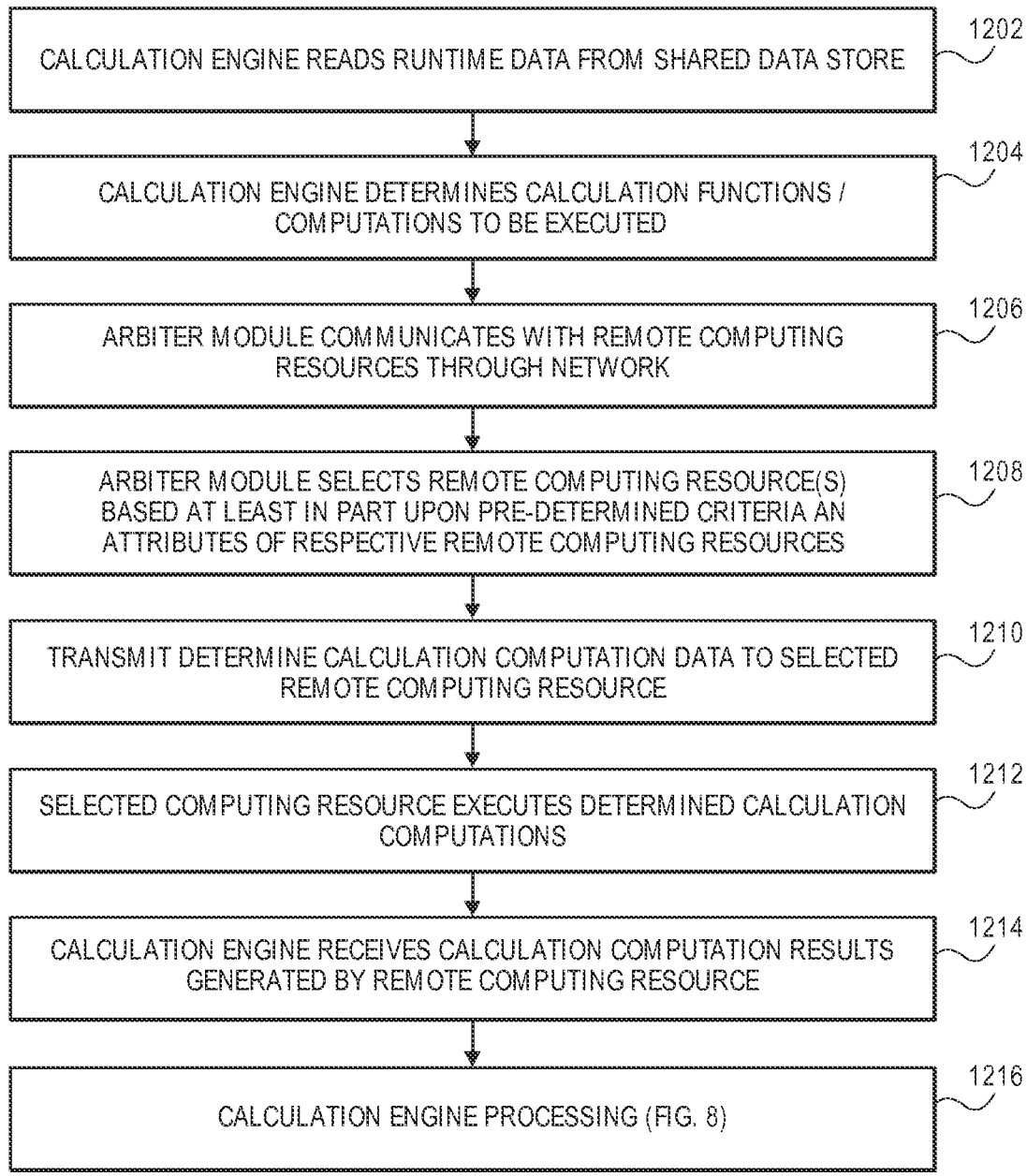
FIG. 12 is a flow diagram illustrating processing by a calculation engine and an arbiter module for selecting a remote computing resource for performing calculation computations reflected in a calculation graph.

With continuing reference to Figs. FIGS. 4 and 11, and with further reference to FIG. 12, in a computer-implemented method, at 1202, calculation engine 480 reads runtime data 442 from shared data store 440, and at 1204, determines calculation functions/computations to be executed. At 1206, following receipt of user authorization via user interface module 430 if required, arbiter module 485 communicates with remote computing resources 486 through networks. At 1208, in embodiments that involve remote computing resources 486 (or together with use of a local resource such as calculation engine 480 or a computation component of tax logic agent 410), arbiter module 485 selects one or more remote computing resource 486 based at last in part upon pre-determined selection criteria and attributes of respective remote computing resources 486.

Selection of a computing resource 486 by arbiter module 485 may be based at least in part upon pre-determined selection criteria and attributes of respective remote computing resources 486 and may involve various calculation graphs 482 and portions thereof and for various electronic tax returns of various taxpayers or users. In certain embodiments, computing resource 486 selection is based at least in part upon availability of a remote computing resource 486, and assuming it is available, a financial cost of utilizing a remote computing resources 486 to perform determined computations. The financial cost may, in certain embodiments, be based on spot instances, which involve the tax preparation system or host thereof transmitting electronic bid prices for one or more spot instances, such as those available from Amazon Inc. Arbiter module 485 can transmit bids or name a price for using a certain computing resources 486, such as Elastic Compute Cloud (EC2) resources of Amazon Inc. Thus, when a bid price offered by arbiter module 485 or other component of modular tax preparation application is greater than a spot instance price, that remote computing resource 486 at that spot instance price is secured by arbiter module 485 for computations. Other computing resource selection criteria that may be utilized include computation time, e.g., depending on the speed or loads on computing resources 486, and geographic locations of computing resources 486. For example, remote computing resources 486 of certain countries or companies may be considered to be more secure than other countries or companies, which may be a factor when considering how to process sensitive data 442s ("s" indicating "sensitive"), or prioritizing geographic locations closer to the user of the tax preparation application.

Computations to be performed by a selected computing resource 486 may be for a calculation graph 482. A computing resource 486 may also be selected for a portion of a calculation graph 482 such as a group of input or leaf nodes 702 and an associated function 704 for a particular tax topic or form, e.g., for "W2" nodes and accumulator function as shown in FIG. 7, or multiple groups of input or leaf nodes 702 for multiple topics, which may involve one or multiple tax calculation graphs 482. Computing resource 486 selection may also be for a particular taxpayer or groups of taxpayers, e.g., taxpayers of the same company and for employees having the same title position, or employees of the same pay scale, such as a stepped pay scale of a company or government employer.

With continuing reference to FIG. 12, at 1210, having selected computing resources 486 for computations, data 482c ("c" indicating "computation") of the calculation computations to be performed are transmitted through respective networks 487 to respective remote computing resources 486 or are executed locally by calculation engine 480 (if local computations are to be executed). For this purpose, arbiter module 485 may collect calculation computation data 482c from calculation engine 480 or determine such data by accessing calculation graph(s) 482, and transmit calculation computation data 482c to respective selected computing resources 486 through respective networks 487. In another embodiment, arbiter module 485 instructs calculation engine 480 about how to communicate with selected remote computing resources 486, and calculation engine 480 can then transmit respective data 482c of calculation computations to respective selected remote computing resources 486.

At 1212, the determined computations are executed by respective computing resources 486, and at 1214, calculation engine 480 receives calculation computation results 482r ("r" referring to "results" generated by calculation computations 482c generated by remote computing resource 482) directly from arbiter module 485, and the results 482r are processed as described above with reference to FIG. 8 at 1216 including incorporating results 482r into tax calculation graph 480 and writing results 482r to shared data store 440.

When using instances of remote computing resource 486, in the event of computing resource 486 interruption, e.g., due to a spot instance price exceeding a bid price when additional processing is to be performed or an allotted time expiring, calculation engine 480 can receive the first subset of results 482r generated during the first instance and arbiter module 485 can select another remote computing resource 486 that is utilized for remaining computations.

Figure 13:
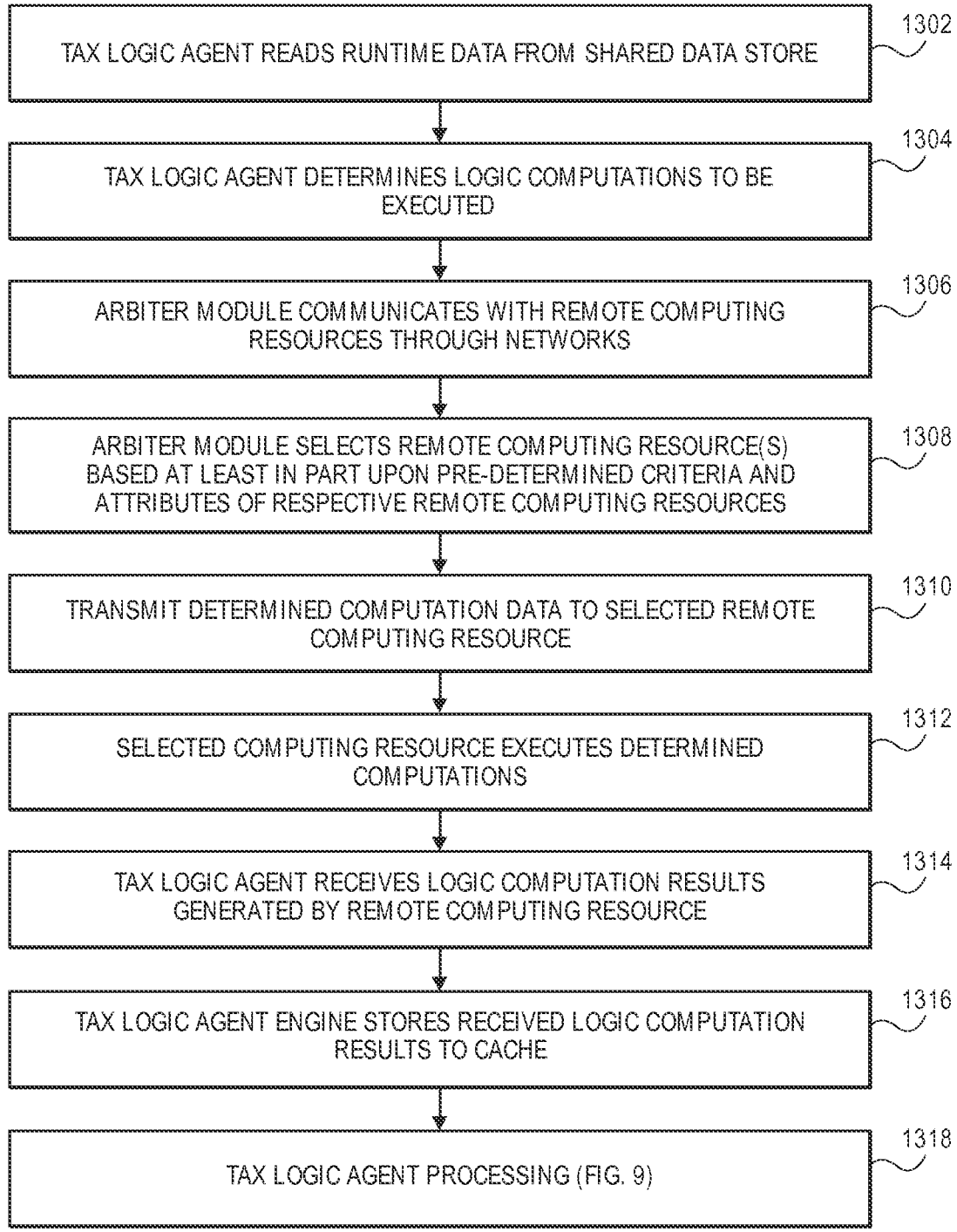
FIG. 13 is a flow diagram illustrating processing by a tax logic agent engine and an arbiter module for selecting a remote computing resource for performing calculation computations.

Referring to FIG. 13, in embodiments in which logic computations are computed by remote computing resource 486 for tax logic agent 410, at 1302, tax logic agent 410 reads runtime data 442 from shared data store 440, and at 1304, tax logic agent 410 determines logic computations (versus calculation computations of calculation graph) to be executed, e.g., as described with reference to FIGS. 5A-6C. At 1306, arbiter module 485 communicates with remote computing resources 486 through networks 487 and at 1308, selects remote computing resource(s) 486 based at last in part upon pre-determined criteria and attributes of respective remote computing resources. At 1310, having selected computing resource(s) 486, arbiter module 485 transmits logic computation data 460c ("c" indicating "computation") including applicable sections of completion graph 465 or decision table 462 and applicable runtime data 442 from cache 414 a needed, to selected remote computing resource 486, which at 1312, executes determined computations. At 1314, tax logic agent 410, directly or through arbiter module 485, receives logic computation results 460r generated by remote computing resource 486, and at 1316, stores received results 460r to the tax logic cache 414 for tax logic agent 410 processing at 1318 as described above with reference to FIG. 9. Tax logic agent 410 processing of generating non-binding suggestions 411, user interface controller 430 writing of data and results to shared data store 440 and calculation engine 480 reading runtime data 442 from shared data store 440 and writing results back to shared data store 440 as described above are iteratively repeated with received computations and shared data store 440 updates.

In another embodiment, and as illustrated in FIGS. 4 and 11, arbiter module 485 may be utilized to determine how to allocate logic computations 460c involving decision table 460 and calculation computations 482c involving calculation graph 482 for respective tax logic agent 410 and calculation engine 480 components, results 460r/482r of which may be provided at the same time by arbiter module 485 to tax logic agent 410 and calculation engine 480 or as they are received by arbiter module 485.

Further embodiments involve how runtime data 442 is processed to account for certain data being sensitive data 442s, whereas other data is not, and how computing resources 486 are selected for computations involving different types of runtime data 442 or runtime data 442 indicated to be sensitive 442s versus runtime data that is not.

Figure 14:
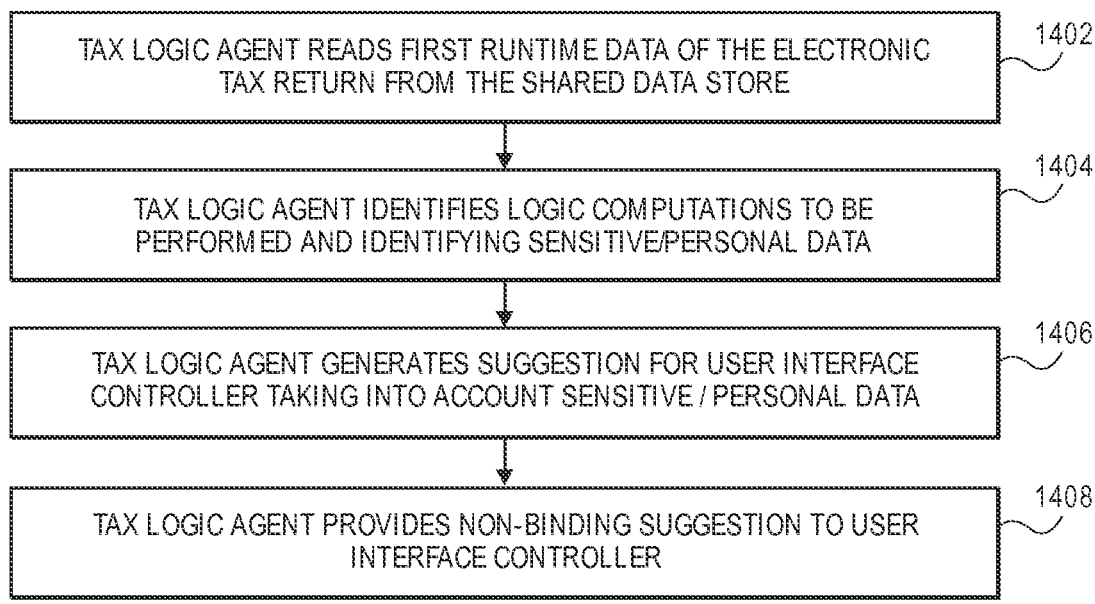
FIG. 14 is a flow diagram illustrating processing of runtime data indicated to be sensitive data.

Referring to FIG. 14, in a method according to one embodiment, at 1402, tax logic agent 410 reads runtime data 442 from shared data store 440, and at 1404, identifies logic computations to be performed and sensitive data 442s thereof. Sensitive data 442s may be personal identification of or related to the taxpayer such as names of taxpayer, spouse, children or other dependents, social security numbers of these individuals and/or other private data or data that a taxpayer may prefer to not be disclosed or handled more carefully than other data such as a residence address of the taxpayer or person associated with the taxpayer, a data of birth, and an account number, such as an account number of a checking account included in the electronic tax return for receiving a refund. For ease of explanation, reference is made to "sensitive" data 442s. Given the nature of a completeness graph 465 and decision table 460, these data structures may include or involve various types of sensitive data, whereas a calculation graph, in contrast, does not have personal information and instead is populated with numbers, Boolean operators and arithmetic operations.

According to one embodiment, runtime data 442 is indicated to be sensitive data 442s in response to a user input or selection of the data as being sensitive. For example, while a user is providing data through an interview screen 432 generated by UI controller 430, the user may check a menu item or box of the interview screen 432 to indicate that selected data is sensitive data 442s. UI controller 430 can then store the data to the shared data store 410 with an appropriate sensitive data tag 442t. According to another embodiment, the UI controller 430 and/or shared data store 440 are configured to analyze data as it is received, whether from manual input by a user or from an electronic source 450, and select certain data to be designated as sensitive data 442s. According to one embodiment, this involves comparing terms or descriptions of or associate with received or inputted data, comparing the terms or descriptions and pre-determined schema 446 terms designated as sensitive, and storing the inputted or received data to shared data store 440 with a "sensitive data" tag 442t.

With continuing reference to FIG. 14, at 1406, tax logic agent 410 generates a non-binding suggestion 411 for user interface controller 430 taking into account sensitive/personal data 442s by, in one embodiment, processing sensitive data 442s differently compared to non-sensitive data or data not indicated to be sensitive. At 1408, tax logic agent 410 provides non-binding suggestion 411 to user interface controller 430, which is processed as described above.

Figure 15A:
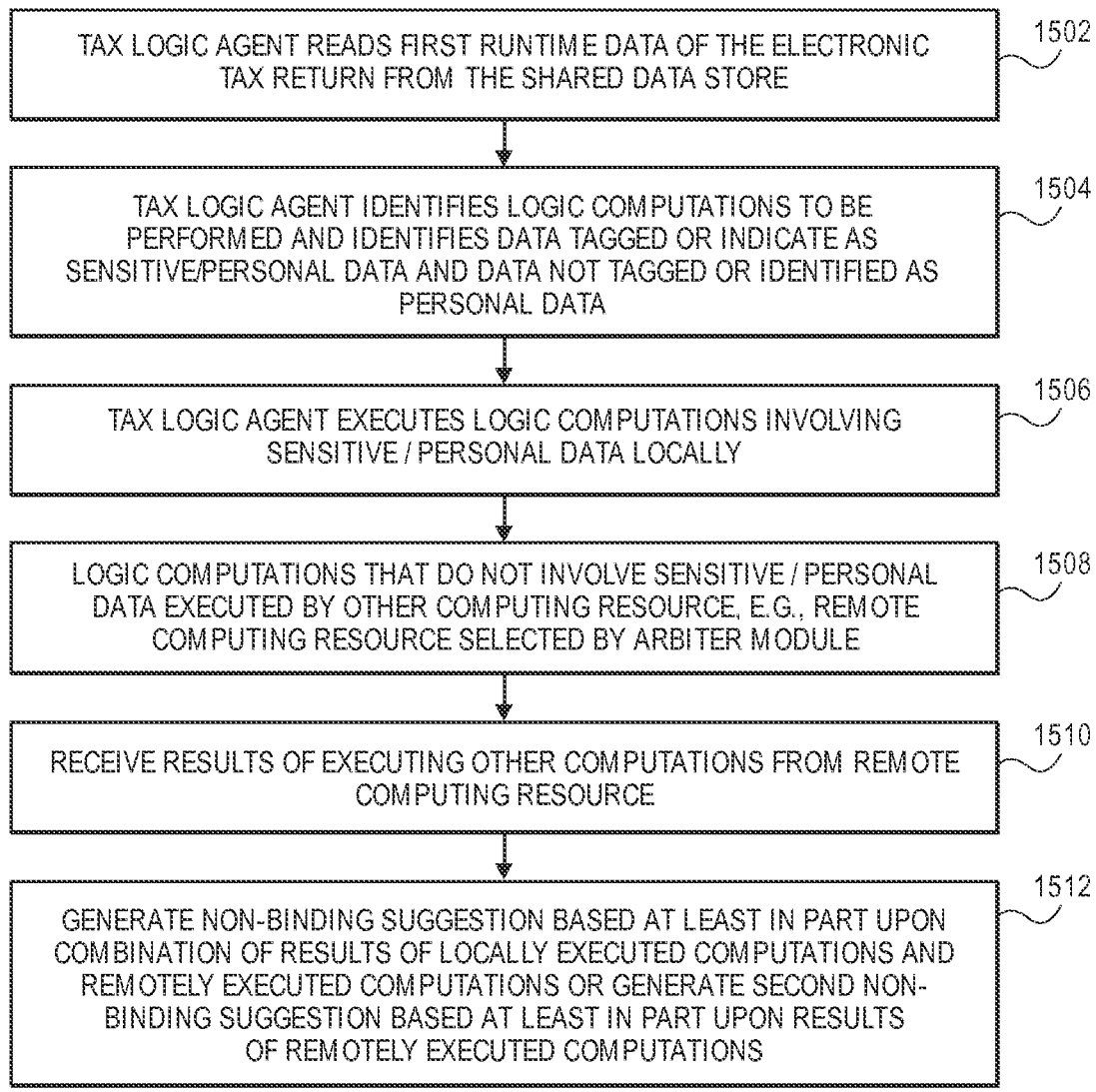
FIG. 15A is a flow diagram illustrating processing of runtime data indicated to be sensitive data that involves executing logic computations involving sensitive data locally and executing other computations remotely.
Figure 15B:
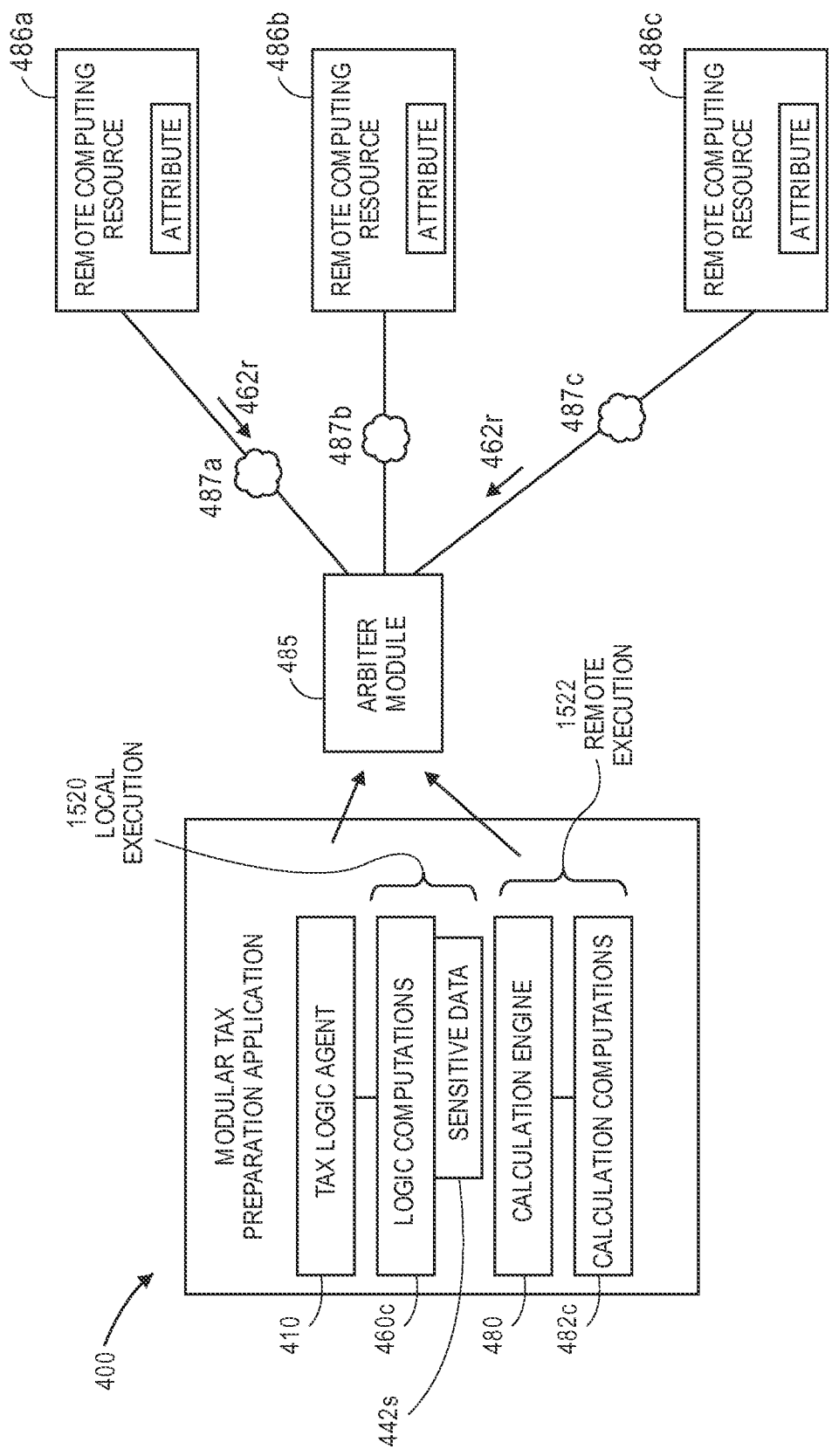
FIG. 15B is a system block diagram illustrating how local and remote execution can be used when certain logic computations involve sensitive data.
Figure 16:
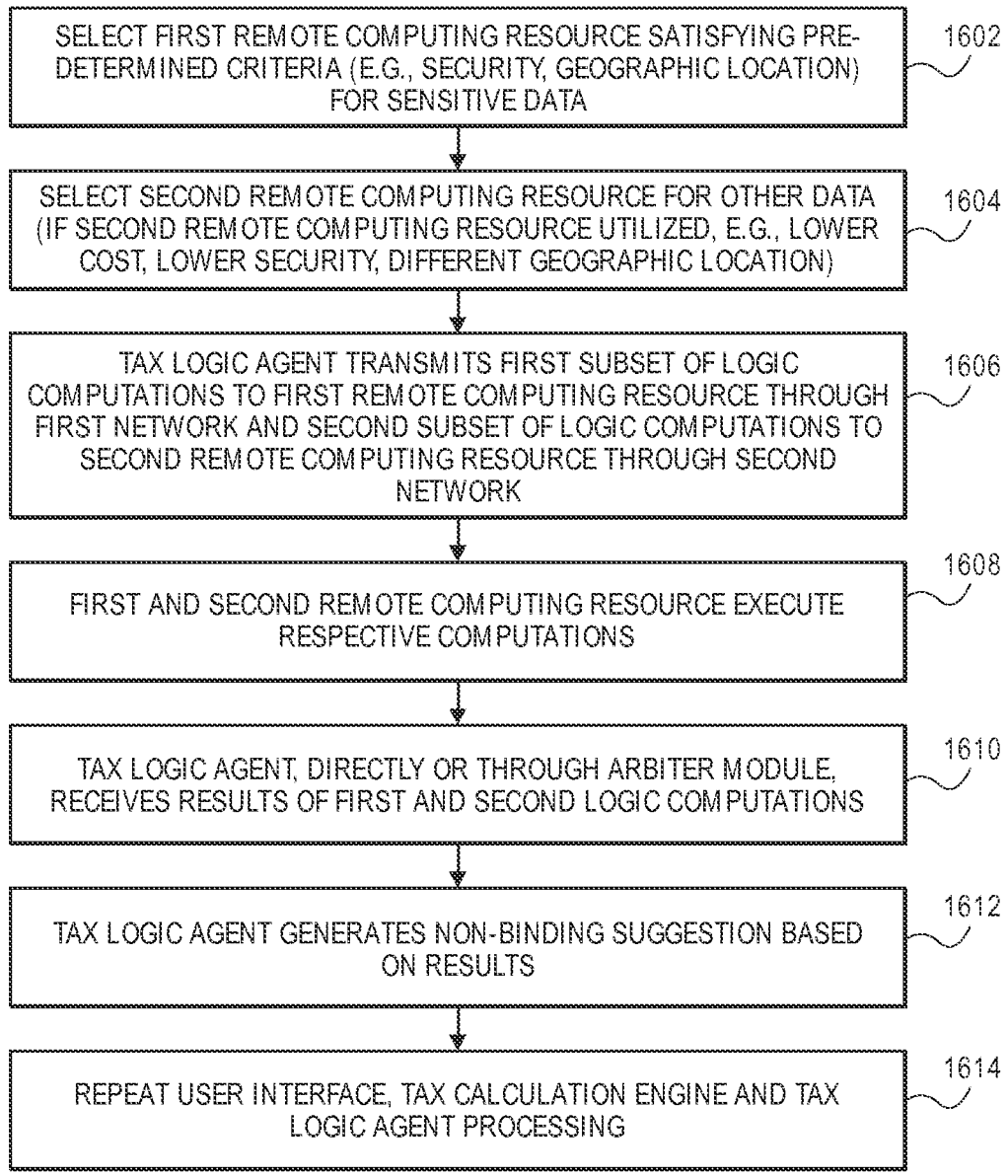
FIG. 16 is a flow diagram illustrating processing of runtime data indicated to be sensitive data that involves executing logic computations involving analyzing remote computing resource attribute and executing logic computations involving sensitive data remotely when remote computing resource attributes satisfy pre-determined criteria.
Figure 17:
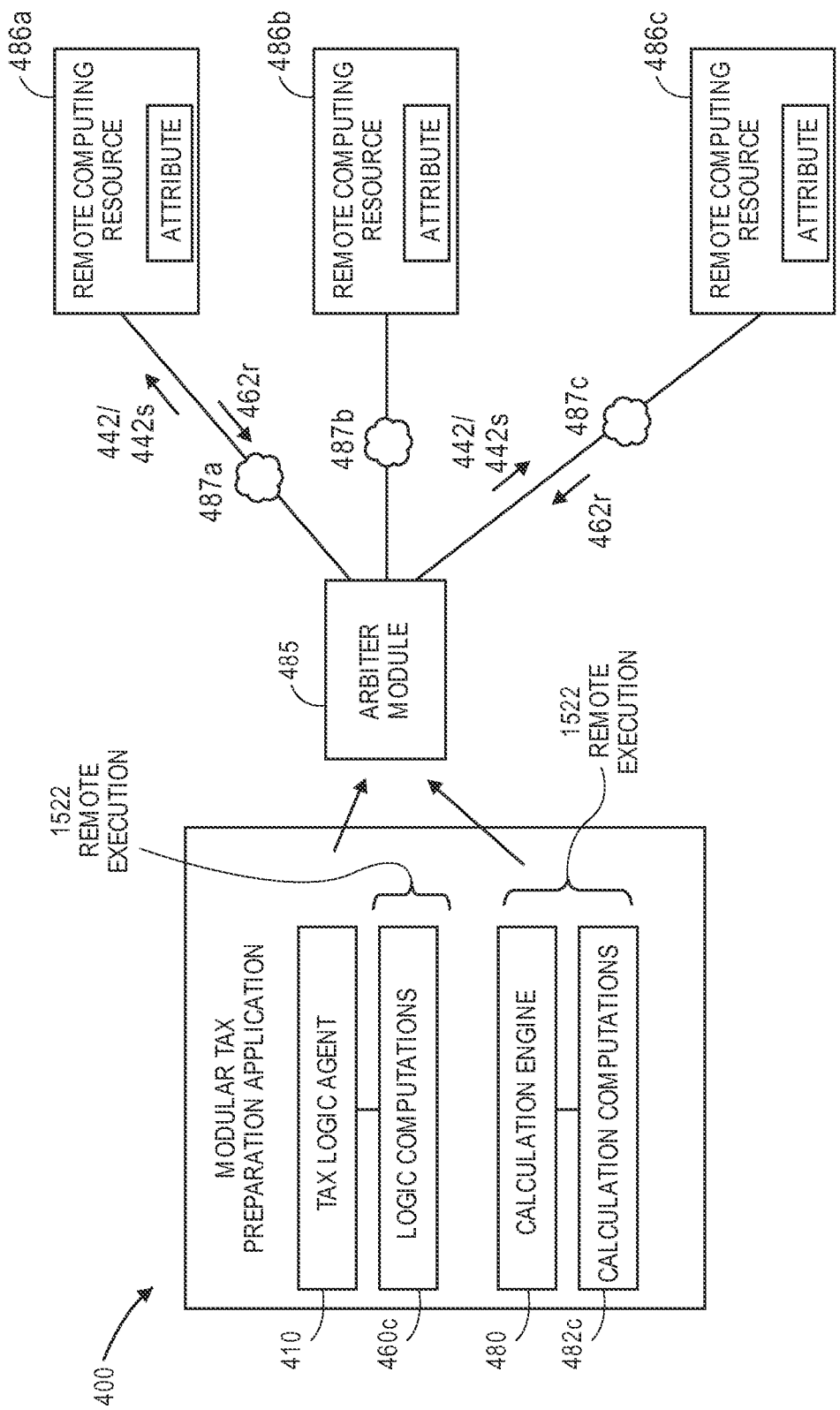
FIG. 17 is a system block diagram illustrating how logic computations involving sensitive data can be remotely executed.

For example, referring to FIGS. 15A-B, one embodiment involves local execution 1520 of logic computations involving data designated as sensitive 442s and executing other logic computations remotely 1522. In one embodiment tax logic agent 410 reads first runtime data 442 from shared data store 440 at 1502, and at 1504, identifies logic computations to be performed and data tagged or indicated as sensitive/personal data 442s. At 1506, tax logic agent 410 performs local execution 1602 of logic computations involving sensitive/personal data 442s, whereas at 1508, logic computations that do not involve sensitive/personal data 442s are executed remotely 1604 by other computing resource(s), e.g., remote computing resource 486 selected by arbiter module 485 and then received from remote computing resource 486 or arbiter module 485 as described above. At 1510, tax logic agent 410 receives results 460r of executing other logic computations from remote computing resource 486, and at 1512, generates a non-binding suggestion 411 based at least in part upon a combination of results of locally executed 1520 computations and remotely executed 1604 computations or generate second non-binding suggestion 411 based at least in part upon results 460r of remotely executed computations, and the non-binding suggestions 411 are provided to UI controller 430 as described above.

Referring to 16-17, another embodiment involves executing logic computations involving data designated as sensitive remotely 1522 assuming certain criteria are satisfied. The criteria may be whether a remote resource 486 has sufficient security features such as certain encryption technologies. Other embodiments, may involve dividing computations involving sensitive data 442s among multiple remote computing resources 486 such that even assuming a breach of one of the remote computing resources 486, only certain sensitive data 442s is stolen by the wrongdoer. For example, for sensitive data 442s of a name, logic computations involving a first name may be processed by a remote computing resource 486, whereas logic computations involving a last name may be processed by another remote computing resource 486. As another example, for sensitive data 442s of an address, logic computations involving a house number may be processed by a remote computing resource 486, whereas computations involving the street name may be processed by another remote computing resource 486, and computations involving a city name can be processed by yet another remote computing resource 486. As another example, logic computations involving a checking account number can be processed such that logic computations involving an account number can be processed by one remote computing resource 486 and logic computations involving a routing number can be processed by another remote computing resource 486.

Thus, at 1602, arbiter module 485 in communication with tax logic agent 410 selects a first remote computing resource 486 (or second/additional remote computing resource 486 if distributing logic computations involving sensitive data 442s to different resources) satisfying pre-determined criteria (e.g., one or more of security, encryption utilized, geographic location, financial cost/spot instances) for sensitive data 442s, and at 1604, selects a second remote computing resource 486 for other data (if second remote computing resource utilized, e.g., lower cost, lower security, different geographic location) for other computations that do not involve sensitive data. Tax logic agent 410 or arbiter module 485, at 1606, transmits first subset of logic computations involving sensitive data 442s to first remote computing resource 486 through first network 487 and second subset of logic computations to second remote computing resource 486 through second network 487. At 1608, selected first and second remote computing resources 486 execute respective computations, and at 1610, tax logic agent 410, directly or through arbiter module 485, receives results of first and second logic computations and at 1612, tax logic agent 410 generates runtime data/results as described above by generating one or more non-binding suggestions 411 for UI controller 430. UI controller 430 writes data to shared data store to update runtime data, and calculation engine reads updated runtime data from shared data store and writes calculation results back to shared data store to further update runtime data, which is then read by tax logic agent. These iterations continue until a state of completeness.

Other embodiments involve determining a result of a tax calculation for an electronic tax return that is being prepared without performing the tax calculation during preparation of the current electronic tax return, and preparing at least portions of electronic tax returns for various taxpayers based on these determined results, which may even be before the taxpayers have begun preparation of their own returns or even purchased and executed a tax preparation application.

Figure 18:
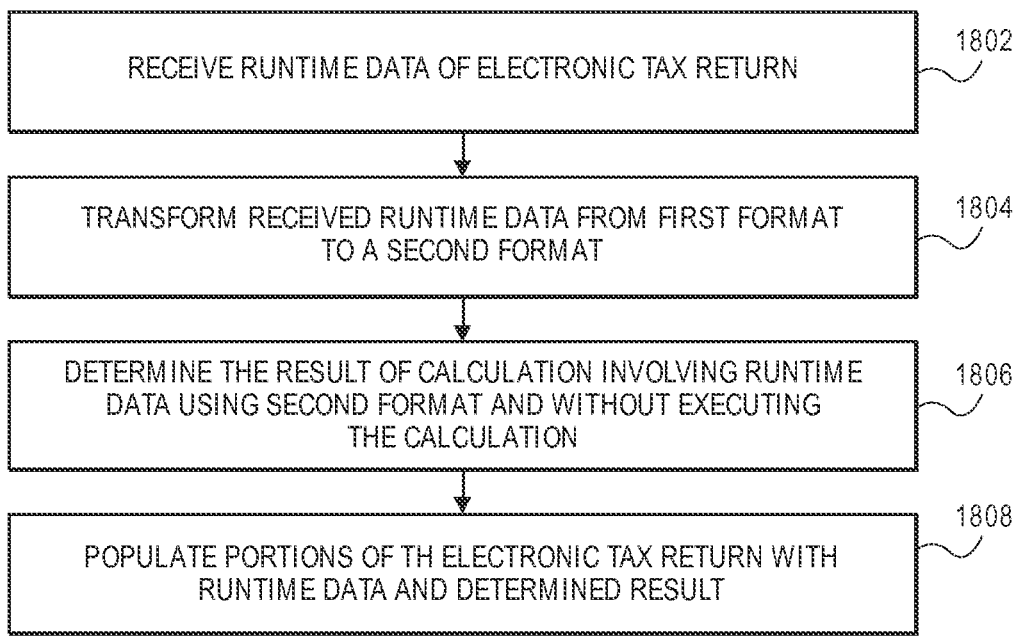
FIG. 18 is a flow diagram illustrating a computer-implemented method for determining a calculation result for a current electronic tax return being prepared without executing a calculation for the current electronic tax return based on a runtime data transformation and processing of transformed data.

Referring to FIG. 18, in one embodiment, a tax preparation application system that is employed by a taxpayer to prepare an electronic tax return receiving runtime data 442 of electronic tax return at 1802, and at 1804, convert or transform received runtime data 442 of a first format into a second format. At 1806, the second format is utilized to determine a result of a computation involving runtime data 442, without actually executing the calculation during preparation of the electronic tax return. According to one embodiment, a result of a previously determined calculation of another electronic tax return of another taxpayer is used for the current electronic tax return of the current taxpayer. At 1808, respective portions of the electronic tax return can be populated with runtime data and determined results.

Figure 19:
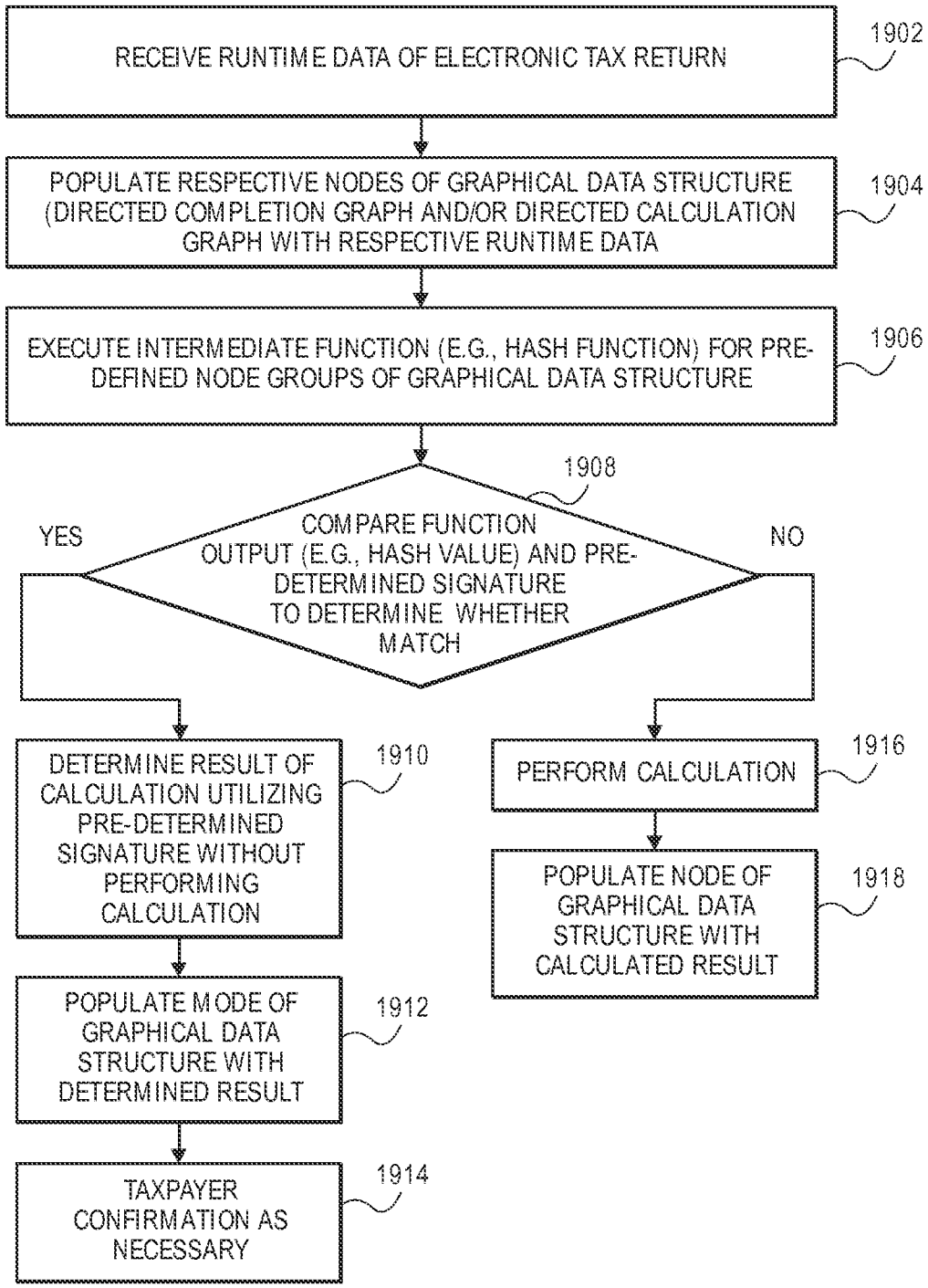
FIG. 19 is a flow diagram illustrating a computer-implemented method for determining a calculation result for a current electronic tax return being prepared without executing a calculation for the current electronic tax return utilizing an intermediate function such as a hash function that is used to look up a calculation result so that it is not necessary to calculate the same result.
Figure 20:
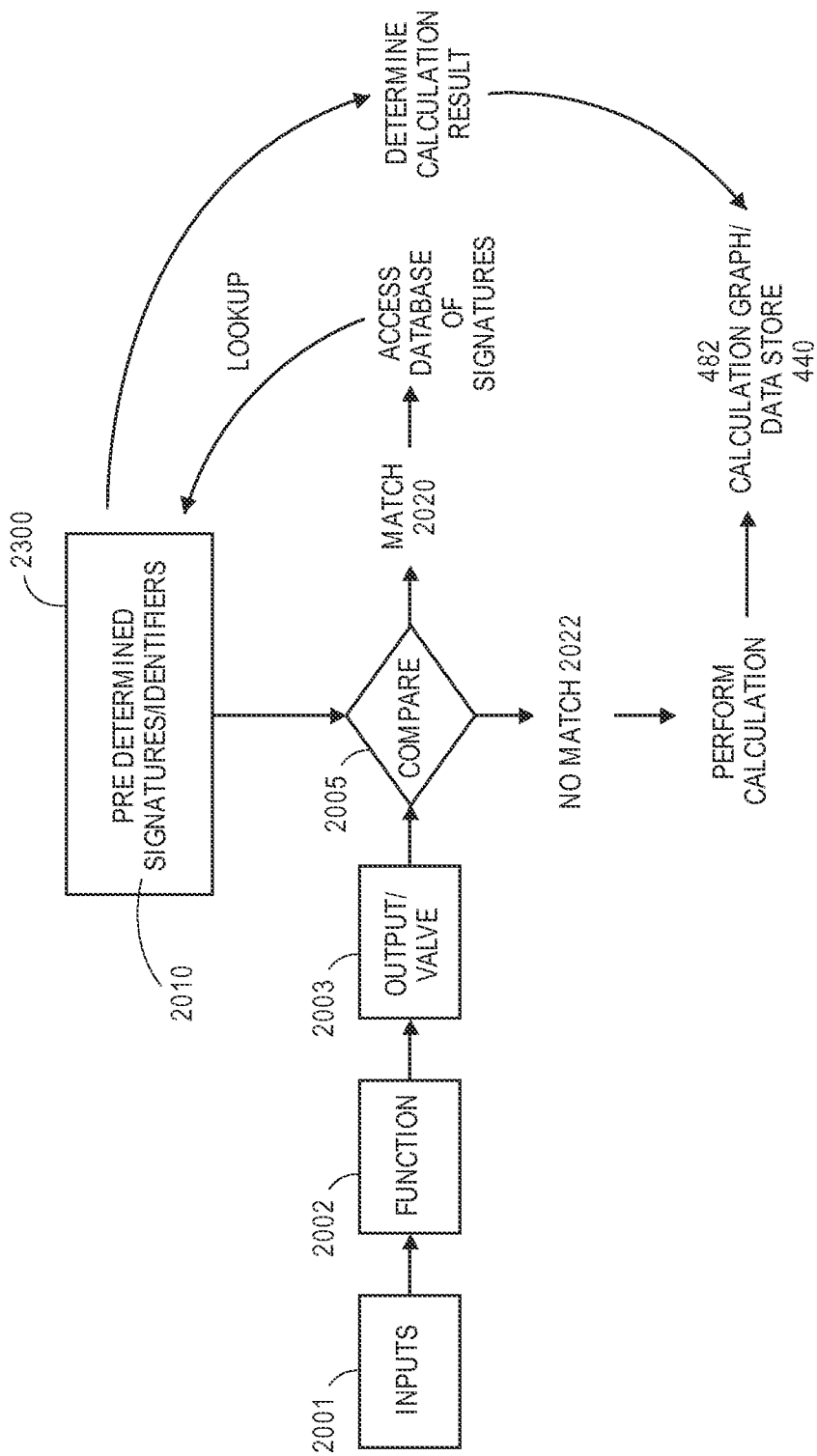
FIG. 20 is a system flow diagram illustrating how a calculation result for a current electronic tax return being prepared without executing a calculation for the current electronic tax return utilizing an intermediate function such as a hash function that is used to look up a calculation result so that it is not necessary to calculate the same result.

Referring to FIGS. 19-20, in one embodiment, at 1902, the tax preparation application, e.g., calculation engine 480, receives runtime data 442 of electronic tax return, and at 1904, populates respective nodes of a directed calculation graph 482. While certain embodiments are described with reference to a calculation engine 480, a directed calculation graph with input, function and result nodes, and determining results of calculations without performing the calculations during preparation of a current electronic tax return, other embodiments may involve tax logic agent 410, a directed completion graph 465 or decision table 460 and associated data, and determining results of logic analysis without performing the logic computations during preparation of a current electronic tax return. For ease of explanation, reference is made to a calculation engine 482 and calculation computations.

Figure 21:
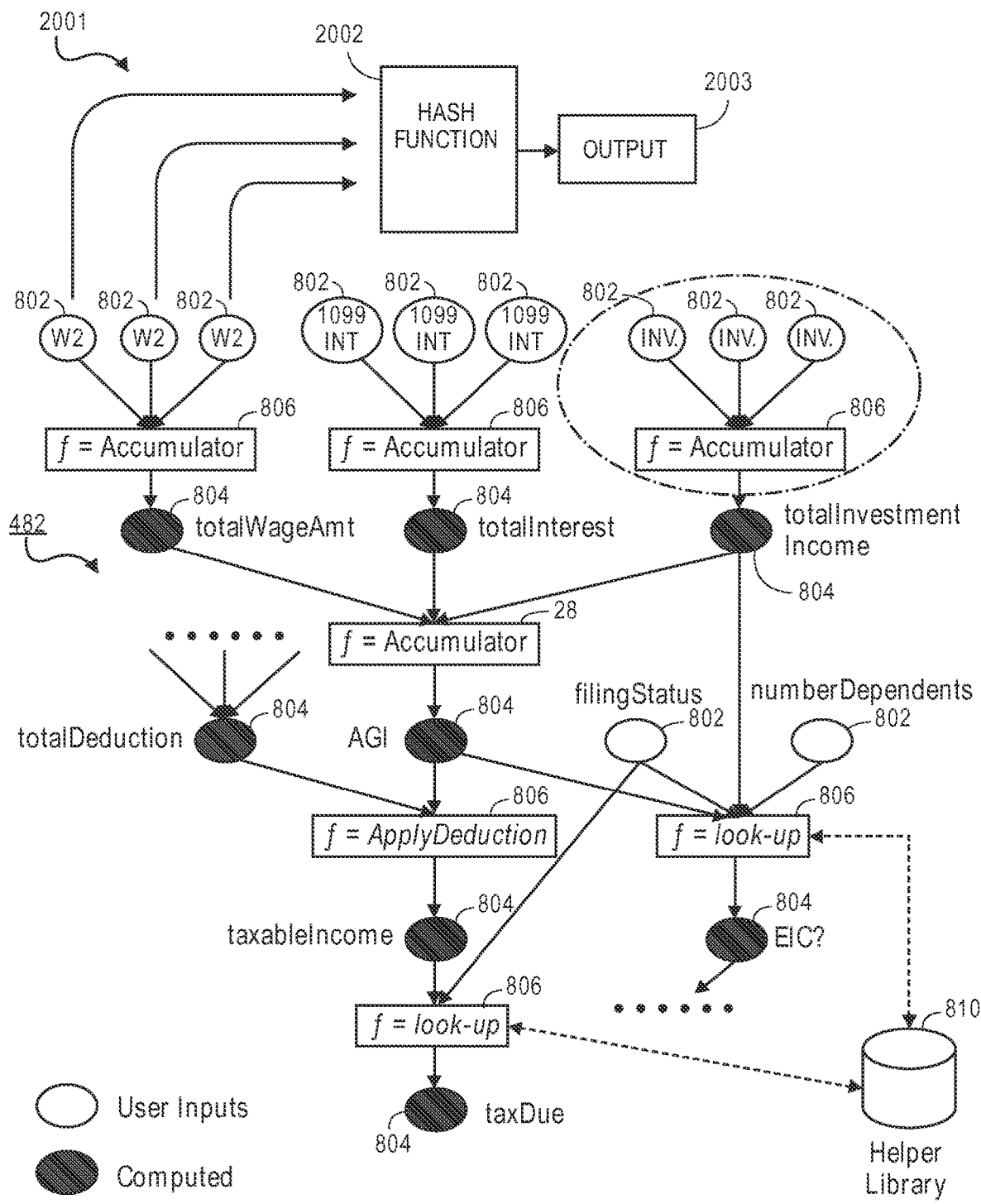
FIG. 21 illustrates how data that populates certain nodes or a group of nodes of a calculation graph shown in FIG. 7 serves as inputs to an intermediate or hash function according to embodiments.
Figure 22:
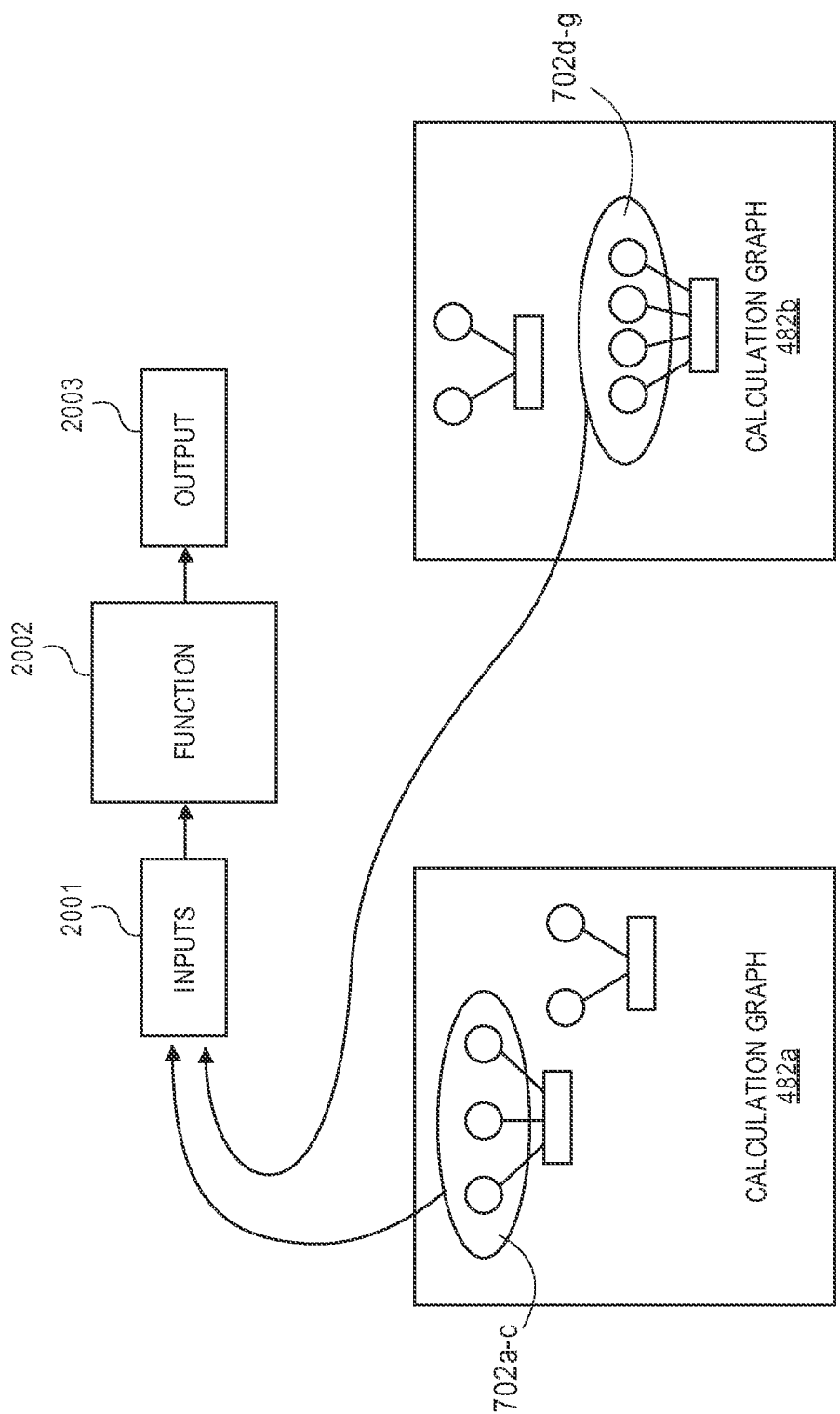
FIG. 22 illustrates how data that populates certain nodes or a group of nodes of multiple calculation graphs serve as inputs to an intermediate or hash function according to embodiments.

With continuing reference to FIGS. 19-22, at 1906, an intermediate function 2002, such as a hash function, is executed using inputs 2001 of data that populates a pre-defined node groups of the directed calculation graph 482. For example, data that populates certain pre-determined nodes of directed calculation graph 482 (as generally illustrated in FIGS. 7 and 21), certain nodes of different calculation graphs 482 (as generally illustrated in FIG. 22), is provided as inputs 2001 to function 2002, such as a hash function. Function 2002 is executed, e.g., by the calculation engine 482, to generate an output or value 2003, such as a hash value. For ease of explanation, reference is made to a hash function 2002, but it will be understood that embodiments are not so limited.

With continuing reference to FIG. 19, at 1908, the output 2003 of the hash function 2002, or the hash value, generated by execution of the hash function 2002 using the specified inputs 2001 is compared 2005 with pre-determined signatures or identifiers 2010 to determine whether the hash value 2003 matches a pre-determined signature or identifier 2010.

If there is a match 2020, then at 1910, the result of a calculation (e.g., a result of a function 706 of the calculation graph 482 that receives the designated inputs, as distinguished from the intermediate or hash function 2002), is determined utilizing the pre-determined signature or identifier 2010, without actually performing the calculation specified by the calculation graph function 706.

According to one embodiment, as shown in FIG. 23, this involves looking up the pre-determined signature or identifier 2010 in a database, table or other data structure 2300 that cross-references pre-determined signatures or identifiers 2005 and respective result data 2012. According to one embodiment, the database, table or other data structure 2300 is populated with pre-determined signatures or identifiers 2005 (column 1) that are outputs 2003 of a function 2002 (e.g., hash function) based on input data of another electronic tax return of another taxpayer, and the data of column 2 is the result 2012 of a calculation of the other electronic tax return of the other taxpayer involving the input data of the other electronic tax return and the hash function 2002.

Referring again to FIGS. 19-20, at 1914, a result node 704, or another input or leaf node 702 associated with the executed calculation/function 706 of the calculation graph 482, is populated with the determined result 2012, and calculation engine 480 writes the determined result 2012 to shared data store 440. The written result 2012 may be tagged as being a determined (versus calculated) data such that when tax logic agent 410 reads the runtime data 442 including the determined result 2012, tax logic agent 410 may generate a non-binding suggestion 411 for UI controller 430 to have the user confirm the determined result 2012.

With continuing reference to FIGS. 19-20, when the output 2003 or hash function value does not match 2022 a pre-determined signature or identifier 2005, then at 1918, calculation engine 480 performs the calculation specified by the calculation graph function 706, and at 1920, populates a result 704 or input/leaf node 702 with the calculated result 2012 and writes the calculated result to shared data store 440 to update runtime data 442.

While FIGS. 19-23 illustrate an embodiment involving input, function and result nodes 702, 704, 706 of calculation graph 480, embodiments may also involve cache 414 data and analysis of completion graph 465 or decision table 460.

Figure 24:
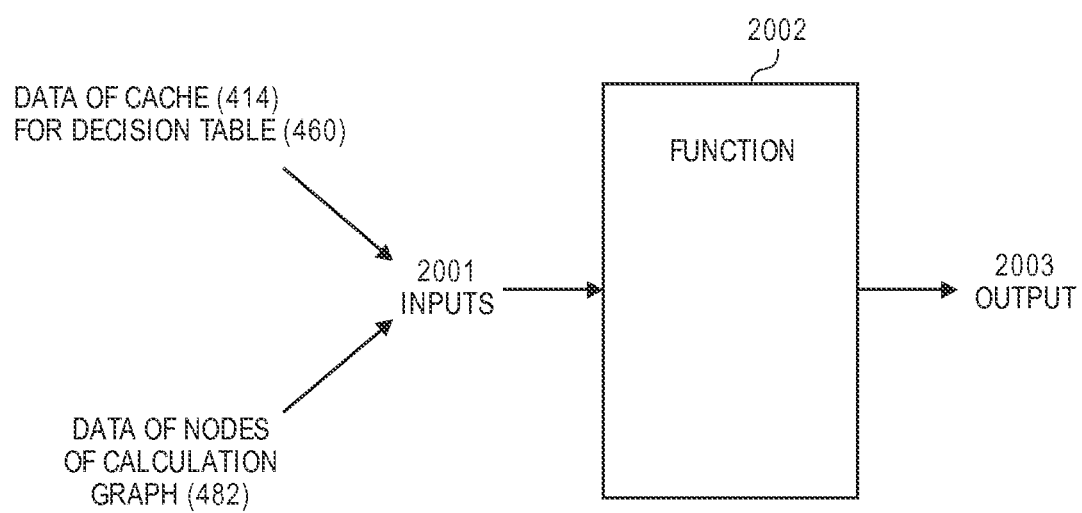
FIG. 24 is a system block diagram illustrating how inputs to a function such as a hash function may include input data in the form of data that populates certain nodes or a group of nodes of a calculation graph and data managed by a tax logic agent and utilized for analyzing a decision table or completion graph.

Further, as shown in FIG. 24, inputs 2001 to function 2002 such as a hash function may include data of pre-determined nodes of calculation graph 482 as described above, in combination with data that is not included in calculation graph 482 and instead is retrieved from tax logic cache 414 and that involve certain aspects of completion graph 465 or decision table 460 as determined by rule engine 412.

Thus, with embodiments, certain calculations of a current electronic tax return being prepared need not be executed, and instead, can be determined indirectly via an intermediate function such as a hash function 2002, the output 2003 of which is used as a lookup or key to a previously calculated result of a calculation of another electronic tax return of another taxpayer, which is then utilized for the current electronic tax return being prepared. Thus, with embodiments, a calculation result can be determined without calculation by the tax preparation application utilized to prepare the current electronic tax return. Further, with embodiments, an electronic tax return can be started or at least populated for a taxpayer without knowledge of the taxpayer, and before the taxpayer has started the electronic tax return or even purchased the tax preparation application.

For example, if an electronic tax return of a first taxpayer was prepared, and which involved calculating results, the calculation graph for that electronic tax return can be mined to identify results of calculations and inputs used to generate those results, and those mined inputs can be provided as inputs to a hash function, the output of which is included in a database, table or other data structure as a pre-determined signature or identifier that is linked to or associated with the previously calculated result for that taxpayer. Inputs and calculated results that can be utilized for this purpose can be selected when, for example, a pre-determined minimum number of electronic tax returns involve the same inputs and corresponding results, e.g., for employees of a government agency or employer that have the same pay scale, compensation level or title and involve common tax situations or tax data.

At a later time, when a tax preparation application receives data of another taxpayer, as part of preparing a current electronic tax return or independently of an electronic tax return, those inputs can be analyzed and applied to the hash function, and when the hash function output matches a pre-determined signature or identifier, then a result of a calculation can be read from or determined from the database or table, which may be used to being preparation of an electronic tax return such that employees can be advised that their electronic tax returns have been prepared even before those employees have started their returns, or to populate at least a portion of an electronic tax return being prepared.

Figure 25:
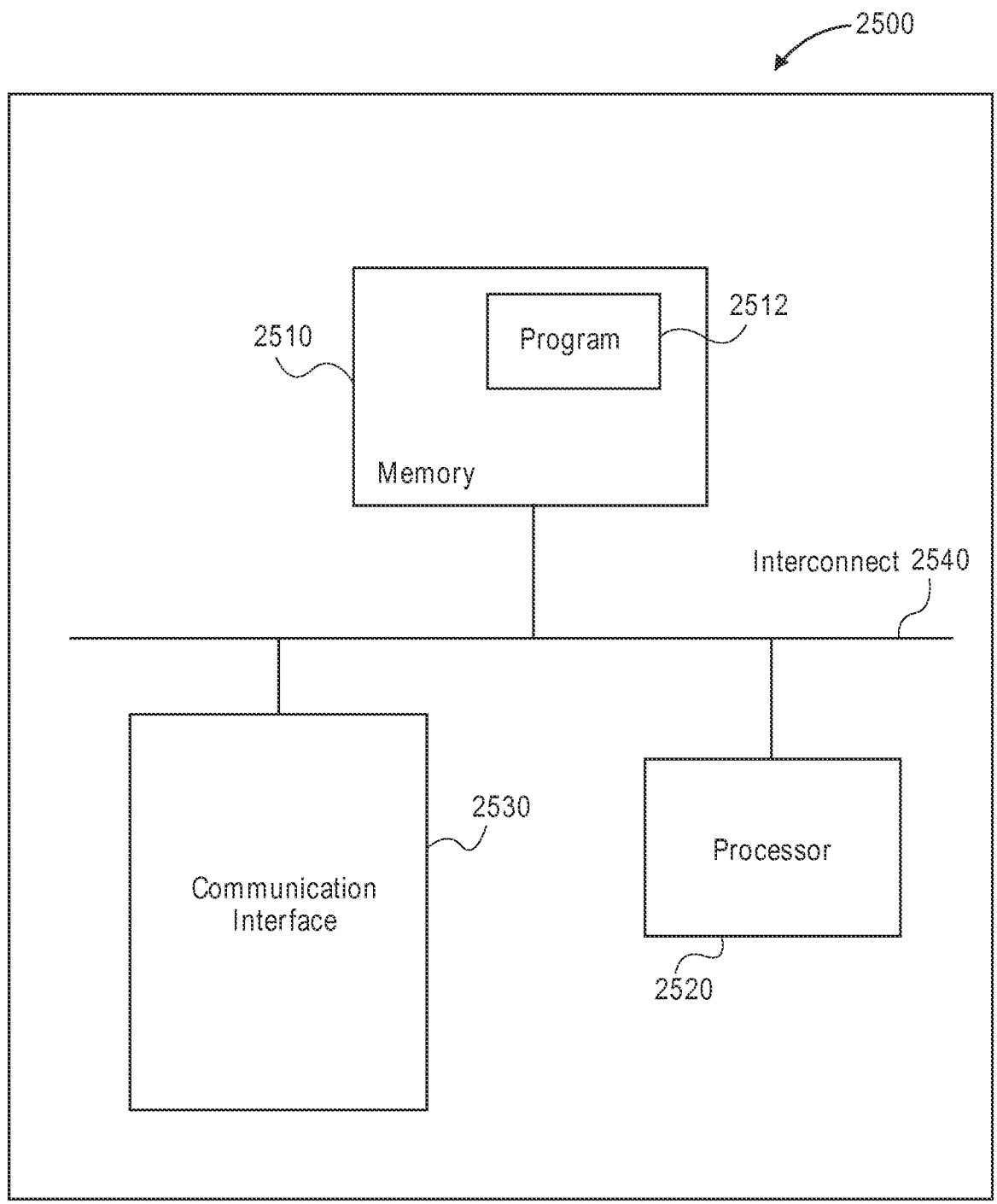
FIG. 25 is a block diagram of components of a computer system that may be programmed or configured to execute embodiments

FIG. 25 generally illustrates certain components of a computing device 2500 that may be utilized to execute or that may embody components of embodiments. For example, the computing device may include a memory 2510, program instructions 2512, a processor or controller 2520 to execute instructions 2512, a network or communications interface 2530, e.g., for communications with a network or interconnect 2540 between such components. The memory 2510 may be or include one or more of cache, RAM, ROM, SRAM, DRAM, RDRAM, EEPROM and other types of volatile or non-volatile memory capable of storing data. The processor unit 2520 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2540 may include a system bus, LDT, PCI, ISA, or other types of buses, and the communications or network interface may, for example, be an Ethernet interface, a Frame Relay interface, or other interface. The network interface 2530 may be configured to enable a system component to communicate with other system components across a network which may be a wireless or various other networks. It should be noted that one or more components of computing device 2500 may be located remotely and accessed via a network. Accordingly, the system configuration provided in FIG. 25 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2520 performs steps or executes program instructions 2512 within memory 2510 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer implemented method comprising:

reading, by a first process executed by at least one processor, first runtime data of an electronic tax return from a shared data store;

scanning, by the first process executed by the at least one processor, the first runtime data for one or more sensitive data tags;

detecting, by the first process executed by the at least one processor, the one or more sensitive data tags as an outcome of the scanning;

identifying within the first runtime data, by the first process executed by the at least one processor, a first subset of the first runtime data tagged by the detected one or more sensitive data tags, wherein the first subset of the first runtime data is sensitive data based on the tags;

identifying within the first runtime data, by the first process executed by the at least one processor, a second subset of the first runtime data that is untagged by the detected one or more sensitive data tags, wherein the untagged second subset of the first runtime data is non-sensitive data based on being untagged;

selecting, by the first process executed by the at least one processor, a first subset of logic computations to be performed on the sensitive data;

selecting, by the first process executed by the at least one processor, a second subset of logic computations to be performed on the non-sensitive data;

identifying, by the first process executed by the at least one processor, a first remote computing source;

receiving, by the first process executed by the at least one processor, one or more security attributes of the first remote computing source;

comparing, by the first process executed by the at least one processor, the one or more security attributes of the first remote computing source against one or more pre-determined minimum security criteria to identify first matches between the one or more security attributes of the first remote computing source and the one or more pre-determined minimum security criteria;

in response to identifying the first matches, indicating, by the first process executed by the at least one processor, that the first remote computing source has security attributes satisfying the pre-determined minimum security criteria;

identifying, by the first process executed by the at least one processor, a second remote computing source;

receiving, by the first process executed by the at least one processor, one or more security attributes of the second remote computing source;

comparing, by the first process executed by the at least one processor, the one or more security attributes of the second remote computing source against the one or more pre-determined minimum security criteria to identify second matches between the one or more security attributes of the second remote computing source and the one or more pre-determined minimum security criteria;

in response to identifying the second matches, indicating, by the first process executed by the at least one processor, that the second remote computing source has security attributes satisfying the pre-determined minimum security criteria;

identifying, by the first process executed by the at least one processor, a third remote computing source;

transmitting, by the first process executed by the at least one processor through a first network and to the first remote computing resource, a first portion of the first subset of logic computations in response to the indicating that that the first remote computing source has security attributes satisfying the pre-determined minimum security criteria, wherein the first remote computing resource executes the first subset of logic computations involving sensitive data;

transmitting, by the first process executed by the at least one processor through a second network and to the second remote computing resource, a second portion of the first subset of logic computations in response to the indicating that the second remote computing source has security attributes satisfying the pre-determined minimum security criteria, wherein the second remote computing resource executes the second portion of the first subset of logic computations involving sensitive data to distribute execution of logic computations involving sensitive data among different remote computing resources to enhance security of the sensitive data;

transmitting, by the first process executed by the at least one processor through a third network and to the third remote computing resource, the second subset of logic computations that involve non-sensitive data, wherein the third remote computing resource executes the second subset of logic computations;

receiving, by the first process executed by the at least one processor, first results of executing the first portion of the first subset of logic computations involving sensitive data from the first remote computing resource, receiving second results of executing the second portion of the first subset of logic computations involving sensitive data from the first remote computing resource, receiving third results of executing the second portion of the first subset of logic computations from the third remote computing resource;

storing, by the first process executed by the at least one processor, the first results, the second results, and the third results to the shared data store to update the first runtime data to generate second runtime data;

reading, by the first process executed by the at least one processor, the second runtime data from the shared data store;

generating, by the first process executed by the at least one processor, a first non-binding suggestion including interview screen content that is dependent upon at least a portion of the first results, the second results, and the third results in the second runtime data;

generating, by a second process executed by the at least one processor, an interview screen including at least a portion of the interview screen content in the first non-binding suggestion, the interview screen being presented through a display in communication with the at least one processor, and the second process executing independently of the first process;

receiving, by the second process executed by the at least one processor, user input in response to the interview screen; and updating, by the second process executed by the at least one processor, the second runtime data to generate third runtime data based at least in part upon the user input.

2. The method of claim 1, the sensitive data comprising personal identification data of or related to the taxpayer.

3. The method of claim 2, the personal identification data of or related to the taxpayer including one or more of: a name of a taxpayer, a name of a spouse of the taxpayer; a name of a dependent of the taxpayer; a social security number of the taxpayer; a social security number of the spouse; a social security number of the dependent.

4. The method of claim 1, the sensitive data comprising private data of a taxpayer.

5. The method of claim 4, the private data being a residence address of the taxpayer or person associated with the taxpayer or a date of birth of the taxpayer or person associated with the taxpayer.

6. The method of claim 4, the private data comprising an account number.

7. The method of claim 1, the first data structure comprising a completeness directed graph, the method further comprising detecting, by the first process executed by the at least one processor, based on the first runtime data, conditions for a specific topic that have been satisfied or addressed based at least in part upon the completeness graph.

8. The method of claim 7, the completeness directed graph indicating that the electronic tax return is a fileable tax return.

9. The method of claim 7, wherein the completeness graph is not populated with the first runtime data, the method further comprising:
storing, by the first process executed by the at least one processor, runtime data to a cache; and
comparing, by the first process executed by the at least one processor, the first runtime data in the cache and elements of the completeness graph to identify additional data required to complete a specific topic of the electronic tax return.

10. The method of claim 1, further comprising:
reading, by the first process executed by the at least one processor, the third runtime data from the shared data store;
selecting, by the first process executed by the at least one processor, calculation computations to be executed based at least in part upon a second data structure different than the first data structure and the third runtime data;
transmitting, by the first process executed by the at least one processor, through the second network and to the second remote computing resource, the calculation computations, wherein the second remote computing resource executes the calculation computations;

receiving, by the first process executed by the at least one processor, fourth results of executing the calculation computations from the second remote computing resource;

storing, by the first process executed by the at least one processor, the fourth results to the shared data store to update the third runtime data to generate fourth runtime data;

reading, by the first process executed by the at least one processor, the fourth runtime data from the shared data store;

generating, by the first process executed by the at least one processor, a second non-binding suggestion based at least in part upon the fourth runtime data;

generating, by the second process executed by the at least one processor, a second interview screen based at least in part upon the second non-binding suggestion, the second interview screen being presented through the display of the computing device executing or accessing the computerized tax return preparation application to prepare the electronic tax return;

receiving, by the second process executed by the at least one processor, second user input in response to the second interview screen; and updating, by the second process executed by the at least one processor, the fourth runtime data to generate fifth runtime data based at least in part upon the second user input.

11. The method 10, further comprising populating, by the first process executed by the at least one processor, the second data structure with the calculation computation results executed by the second remote computing resource.

12. The method of claim 11, the second data structure comprising a directed calculation graph, the method further comprising determining, by the first process executed by the at least one processor, computations to be performed based at least in part upon nodes of the directed calculation graph.

13. The method of claim 12, the directed calculation graph comprising a directed acyclic graph comprising encoded data dependencies amongst tax concepts or topics.

14. The method of claim 1, the second remote computing resource providing a lower level of security relative to the first remote computing resource.

15. The method of claim 1, wherein a financial cost of utilizing the second remote computing resource is less than a financial cost of utilizing the first remote computing resource.

16. The method of claim 15, respective costs of respective first and second remote computing resources being based on respective spot instances for respective first and second remote computing resources.

17. The method of claim 1, the first remote computing resource being at a first geographic location that is different than a second geographic location of the second remote computing resource.

18. The method of claim 17, wherein the first subset of logic computations involving the sensitive data is not permitted to be executed by a remote computing resource at the second geographic location to enhance security of the sensitive data.

19. The method of claim 1, further comprising:
performing, by the first process executed by the at least one processor, a comparison of elements of a schema of the shared data store from which the first runtime data is read with pre-determined sensitive schema criteria;

identifying, by the first process executed by the at least one processor, sensitive runtime data based at least in part upon the comparison; and identifying, by the first process executed by the at least one processor, logic computations involving the sensitive runtime data, the first subset of logic computations comprising the identified logic computations.

20. The method of claim 1, wherein the sensitive runtime data is stored in the shared data store with an associated tag indicating that the runtime data is sensitive runtime data.

21. The method of claim 20, further comprising tagging, by the second process executed by the at least one processor, runtime data as sensitive data.

22. The method of claim 21, further comprising:

receiving, by the second process executed by the at least one processor, input from the user that certain runtime data is sensitive data; and tagging, by the second process executed by the at least one processor, the runtime data that was the subject of the user input such that a tag indicates that runtime data stored in the shared data store is sensitive runtime data.

\* \* \* \* \*